(12) United States Patent
Takeda et al.

(10) Patent No.: US 11,025,894 B2
(45) Date of Patent: Jun. 1, 2021

(54) HEAD-MOUNTED DISPLAY DEVICE AND DISPLAY CONTROL METHOD FOR HEAD-MOUNTED DISPLAY DEVICE

(71) Applicant: SEIKO EPSON CORPORATION, Tokyo (JP)

(72) Inventors: Takashi Takeda, Suwa (JP); Toshiyuki Kasai, Okaya (JP); Masayuki Takagi, Azumino (JP); Toshiaki Miyao, Matsumoto (JP); Tokito Yamaguchi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/728,315

(22) Filed: Dec. 27, 2019

(65) Prior Publication Data

US 2020/0213580 A1 Jul. 2, 2020

(30) Foreign Application Priority Data

Dec. 27, 2018 (JP) .............................. JP2018-244289

(51) Int. Cl.
*H04N 13/344* (2018.01)
*G02B 27/01* (2006.01)

(52) U.S. Cl.
CPC ....... *H04N 13/344* (2018.05); *G02B 27/0172* (2013.01); *G02B 2027/0134* (2013.01); *G02B 2027/0178* (2013.01)

(58) Field of Classification Search
CPC combination set(s) only.
See application file for complete search history.

(56) References Cited

U.S. PATENT DOCUMENTS 5,973,726 A * 10/1999 Iijima .................. H04N 5/2624
348/38
2014/0104142 A1* 4/2014 Bickerstaff .......... G02B 27/017
345/8
2017/0257620 A1 9/2017 Takeda et al.

FOREIGN PATENT DOCUMENTS

JP 2018-054976 A 4/2018

* cited by examiner

*Primary Examiner* — Robin J Mishler
(74) *Attorney, Agent, or Firm* — Oliff PLC

(57) ABSTRACT

In a left and right pair of a first display device and a second display device that perform repositionable display, mutually different display contents can be visually recognized as a first video image and a second video image. Further, a display control portion controls the display content in accordance with at least one of the first video image and the second video image.

11 Claims, 18 Drawing Sheets

HEAD-MOUNTED DISPLAY DEVICE AND DISPLAY CONTROL METHOD FOR HEAD-MOUNTED DISPLAY DEVICE

The present application is based on, and claims priority from JP Application Serial Number 2018-244289, filed Dec. 27, 2018, the disclosure of which is hereby incorporated by reference herein in its entirety.

BACKGROUND

1. Technical Field

The present disclosure relates to a head-mounted display device represented by a head-mounted display, a display control method for a head-mounted display device, a display control system for a head-mounted display device, a display optical system for a head-mounted display device, a display control device for a head-mounted display device, and a display control program for a head-mounted display device.

2. Related Art

A head-mounted display device, such as a head-mounted display as described in JP-A-2018-54976, for example, is known in which a pair of left and right display devices are provided so as to allow stereoscopic video recognition. By providing first and second common display areas that perform image display of common content to left and right eyes, and an augmented display area that displays images unique to at least one of the left and right, various formats of image display are made possible while causing the image display to be perceived as a large image display. Note that the head-mounted display is also described as an HMD in the following.

However, in a configuration such as that exemplified in JP-A-2018-54976, for example, it is necessary to adjust the position of the left and right display with a high degree of precision so that the image being displayed to the left and right eyes is recognized as the common content. In this case, there is a possibility that it is difficult to respond to demands for maintaining optical performance, miniaturization, and the like, while increasing an amount of information displayed by individually displaying various pieces of information, for example.

SUMMARY

A head-mounted display apparatus according to an aspect of the present disclosure includes: a pair of left and right first display devices and a second display device for reversibly displaying a first video image and a second video image of different display contents. A display control unit configured to control the display content in accordance with the change in the display position of the first video image on the first display device and the display position change of the second video image on the second display device.

DESCRIPTION OF EXEMPLARY EMBODIMENTS

First Embodiment

A head-mounted display device according to a first embodiment of the present disclosure will be described below in detail with reference to FIG. 1 and the like.

Figure 1:
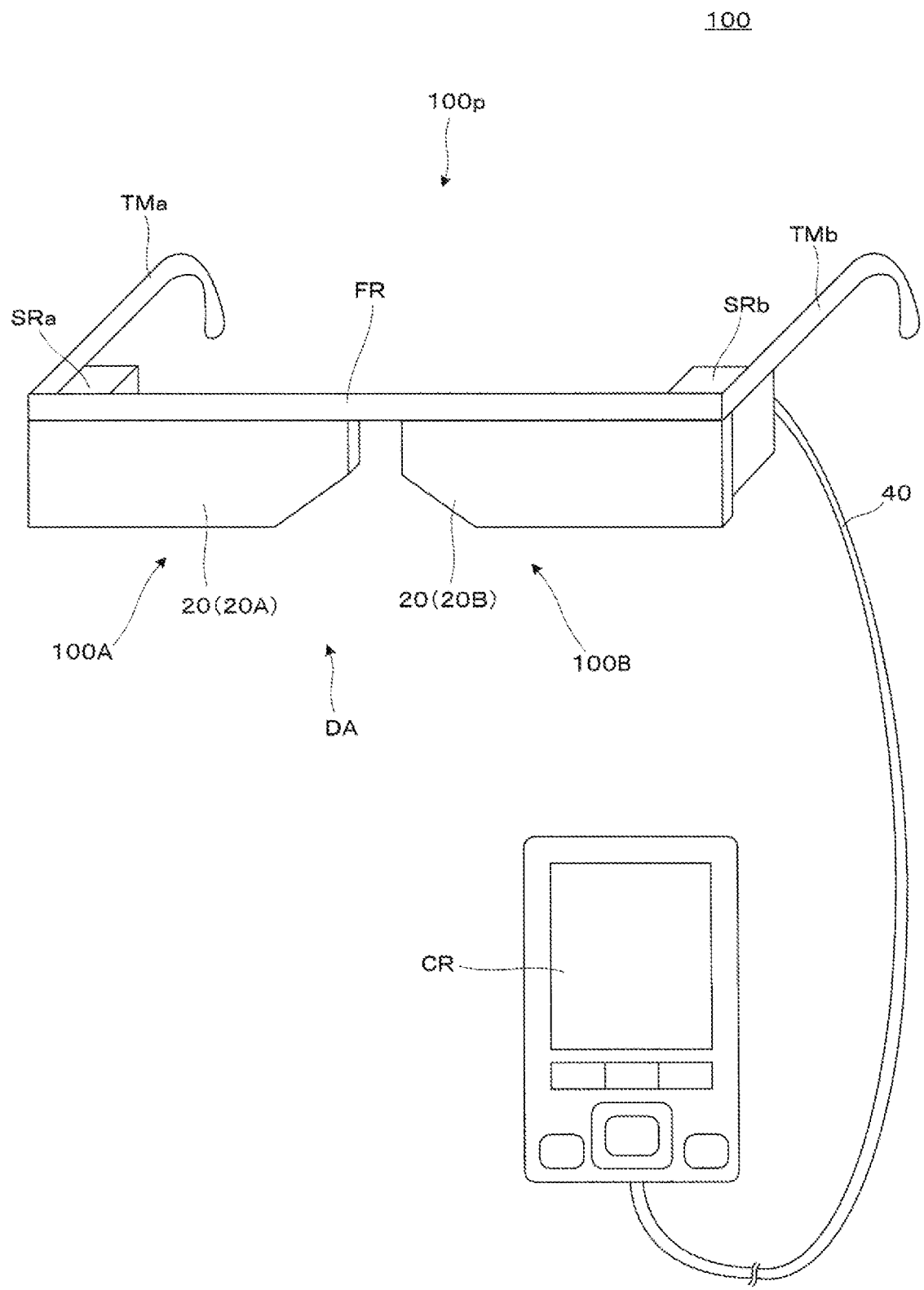
FIG. 1 is a schematic perspective view illustrating a head-mounted display device according to a first embodiment.

For example, as illustrated in FIG. 1 and the like, a head-mounted display device 100 of the present embodiment is a head-mounted display (HMD) having a visual appearance of eyeglasses, and is a virtual display device capable of causing an observer or user wearing the head-mounted display device 100 to visually recognize image light (image light) by a virtual image, and allowing the observer to visually recognize or observe an external world image in a see-through manner. The head-mounted display device 100 is provided with a first display device 100A and a second display device 100B.

Further, the head-mounted display device 100 includes an optical system, such as the first display device 100A or the like, outer packaging members (case members) SRa and SRb that house the optical system, or a frame portion FR that supports the optical system, and additionally, temple portions (temples) TMa and TMb or the like that are disposed on both left and right ends of the outer packaging members SRa and SRb or the frame portion FR and that extend to the rear. In this way, the head-mounted display device 100 can be worn in a similar manner to eyeglasses.

The head-mounted display device 100 is provided with a control device CR that configures a controller or the like as a UI for performing various control operations. In FIG. 1, of the head-mounted display device 100, respective portions on a mounting side, which is a configuration of the eyeglasses, are referred to as a main body 100p, and respective portions on a control side, such as the controller, are illustrated as the control device CR. In this case, the main body 100p configuring the entire mounting side is provided with an entire optical system for image formation in the head-mounted display device 100, and functions as a head-mounted display device display optical system. Note that the control device CR is connected to the main body 100p of the device having the eyeglasses shape by a cable (a connecting portion) 40.

Of the structural components of the head-mounted display device 100 in the drawings, first, the first display device 100A and the second display device 100B are portions that form a virtual image for a left eye and a right eye, respectively. In addition to a light-guiding device 20 that covers the front of the eyes of an observer in a see-through manner, the first display device 100A and the second display device 100B are respectively configured by image display devices (video elements) housed in the outer packaging members SRa and SRb, and an optical system for image formation, such as a projection lens and the like, thus enabling image display as a virtual image with respect to the corresponding left and right eyes. Furthermore, in the present embodiment, the first display device 100A and the second display device 100B include a posture adjustment mechanism that allows a position at which a video image is to be displayed to be changed. Note that a specific example of the head-mounted display device 100 that includes the first display device 100A and the second display device 100B and the like and that is provided with the above-described type of posture adjustment mechanism will be described later with reference to FIG. 10 and the like.

Further, in the present embodiment, the first display device 100A and the second display device 100B each function individually as a virtual display device, and in particular, can display individual video content. Here, the video image displayed by the first display device 100A is referred to as a first video image, and the video image displayed by the second display device 100B is referred to as a second video image. In addition, in the present embodiment, the first display device 100A and the second display device 100B are combined to form a display mechanism DA. In other words, the display mechanism DA includes the pair of the left and right first display device 100A and second display device 100B that display the first video image and the second video image of mutually different display contents.

Hereinafter, control of the head-mounted display device 100 according to the present embodiment will be described with reference to a block diagram in FIG. 2. In particular, here, among the various control operations, control relating to the video display operation will be mainly described.

Figure 2:
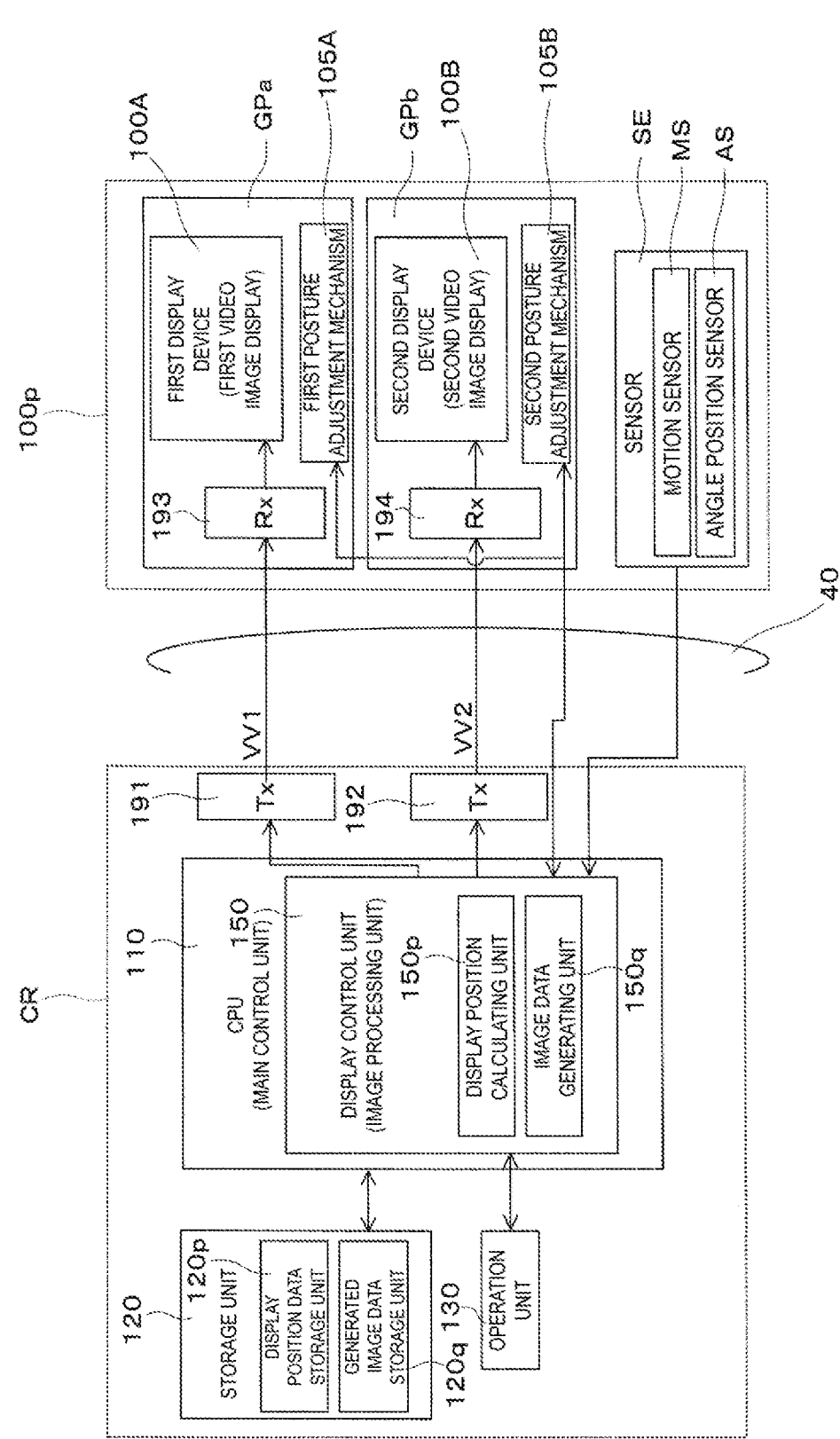
FIG. 2 is a block diagram for describing a control mechanism of the head-mounted display device.

FIG. 2 is a block diagram illustrating an example of a configuration for describing the control of the head-mounted display device 100 illustrated in FIG. 1.

As illustrated here, various signals (in particular, video signals) are transmitted from the control device CR side to the main body 100p. Further, in addition to the first display device 100A and the second display device 100B, the main body 100p is provided with a first posture adjustment mechanism 105A and a second posture adjustment mechanism 105B, as posture adjustment mechanisms, that change display positions of the corresponding first video image and second video image by adjusting the postures of the first display device 100A and the second display device 100B. Furthermore, various types of sensor SE and the like are provided inside devices of the main body 100p. It is conceivable that the various sensors SE include, for example, a motion sensor MS that is configured by a gyro sensor, a camera, or the like, and that allows the posture, movement, and the like of the observer to be detected, by detecting acceleration, angular acceleration, and a rotation angle of the first posture adjustment mechanism 105A and the second posture adjustment mechanism 105B, and the like, and an angle position sensor AS or the like that detects a rotation angle as a detection of the posture adjustment of the first and second posture adjustment mechanisms 105A and 105B. Various signals for the various types of information acquired from these sensors are transmitted to the control device CR from the main body 100p side.

Hereinafter, the configuration of the control device CR will be described in detail. First, of the head-mounted display device 100, the control device CR includes a CPU (main control unit) 110, a storage unit 120, an operation unit 130, and transmission units (Tx) 191 and 192.

The storage unit 120 is configured by a ROM, a RAM, and the like, and various computer programs and types of data are stored in the storage unit 120.

By reading and executing a computer program or data from the storage unit 120, the CPU 110 functions as a display control unit (image processing unit) 150 configured by an operating system (OS) or the like, or as an input signal processing unit or the like. In other words, the CPU 110 functions as a main control unit responsible for the entire control of the head-mounted display device 100 by performing a variety of computational processing.

The operation unit 130 is an external input receiving device (input device) that is operated by the observer or the user, is configured by a determination key, a display switching key, a track pad, a brightness switching key, a direction key, a menu key, and the like, and acquires a signal corresponding to an operation input by the observer or the user.

The transmission units 191 and 192 respectively transmit various data, including video signals generated by the CPU 110, to the first and second display devices 100A and 100B configuring the main body 100p. In other words, the transmission units 191 and 192 function as transceivers for serial transfer between the control device CR and the first and second display devices 100A and 100B.

Here, for example, of the components described above, the display control unit 150 is provided with a display position calculating unit 150p that calculates a display position of the first video image and the second video image on the basis of information transmitted from the main body 100p as one of the various processes, and with an image data generating unit 150q that generates image data as image information to be output to the main body 100p on the basis of a calculation result of the display position calculating unit 150p as another of the various processes. Further, in order to store various pieces of information related to the processing by the display position calculating unit 150p and the image data generating unit 150q, a display position data storage unit 120p and a generated image data storage unit 120q for storing these pieces of information are provided in the storage unit 120.

Note that, in addition to the above, it is also conceivable to provide, on the main body 100p, a line-of-sight sensor or the like for detecting the line of sight of the observer, for example, or to provide various communication devices and interfaces for communicating with the outside, and further to provide various equipment for outputting sound, and the like.

The processing on the main body 100p side of the head-mounted display device 100 will be described below. First, reception units 193 and 194 function as receivers for the serial transfer between the control device CR and the first and second display devices 100A and 100B, and the first and second display devices 100A and 100B perform image formation on the basis of right eye image data and left eye image data respectively received by the reception units (Rx) 193 and 194.

Further, here, the first display device 100A, the first posture adjustment mechanism 105A, and the reception unit 193, which are components for forming an image for the right eye on the main body 100p side, are collectively referred to as a first image forming unit GPa. Similarly, the second display device 100B, the second posture adjustment mechanism 105B, and the receiver 194, which are components for forming an image for the left eye, are collectively referred to as a second image forming unit GPb. In other words, the first image forming unit GPa forms a first video image IM1 illustrated in FIG. 3 and the like on the basis of the image information for the right eye from the control device CR, and the second image forming unit GPb forms a second video image IM2 illustrated in FIG. 3 and the like on the basis of the image information for the left eye from the control device CR.

In the configuration as described above, in a case in which the CPU 110 functions as the display control unit (or the image processing unit) 150, the display control unit 150 generates image data (right eye image data and left eye image data) on the basis of the image signal included in the content or the like for each video image. The generated signals are supplied to the first and second display devices 100A and 100B that configure the main body 100p, as video signals for controlling the display operation of the head-mounted display device 100. In other words, the CPU 110 controls the image display by transmitting the generated video signals to the reception units 193 and 194 via the transmission units 191 and 192, respectively.

Here, as the video signals (image data) to be transmitted, the display control unit 150 generates image information VV1 relating to the first video image IM1 for the first display device 100A and image information VV2 relating to the second video image IM2 for the second display device 100B. In other words, the display control unit 150 transmits data information of different contents, through the image display allowing visual recognition by the right eye and the image display allowing visual recognition by the left eye. Furthermore, in this case, the display control unit 150 forms the image information VV1 and VV2 while taking into account information relating to the posture adjustment (or a state) of the first and second display devices 100A and 100B on the basis of a state of the first and second posture adjustment mechanisms 105A and 105B, which is the rotation angle of the first and second posture adjustment mechanisms 105A and 105B, using the motion sensor MS and the angle angle position sensor AS provided as the sensors SE. In other words, the sensors SE are posture detecting units that detect the posture of the first display device 100A and the second display device 100B and output the detection result to the display control unit 150.

Figure 3:
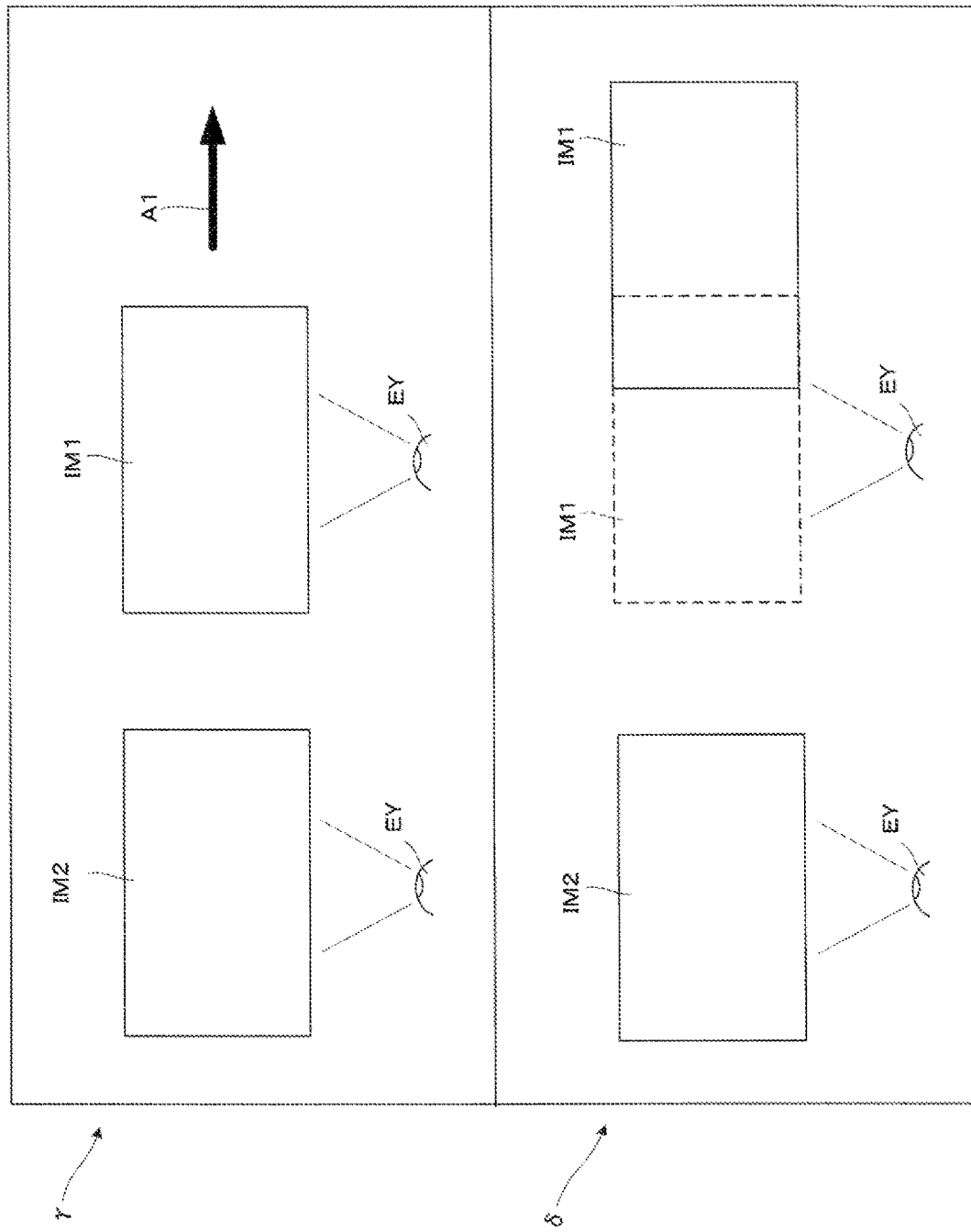
FIG. 3 is a conceptual diagram of an entire video region recognized by stereoscopic vision.
Figure 4:
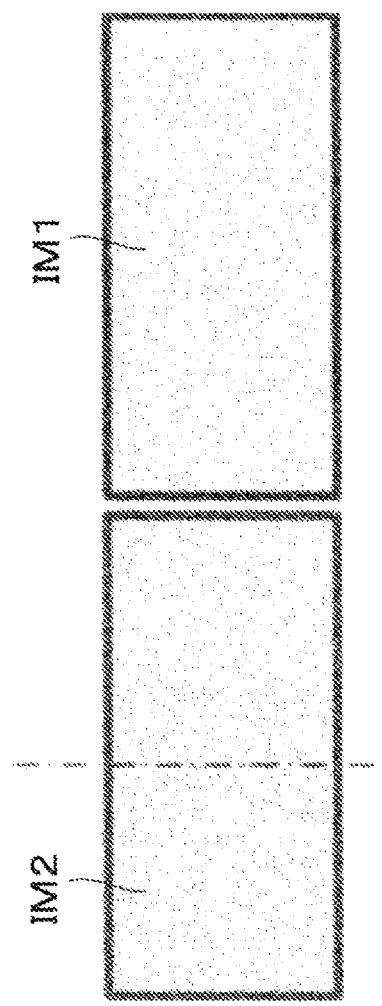
FIG. 4 is a conceptual diagram of the entire video region recognized by stereoscopic vision.

As described above, for example, as illustrated in an upper row γ in FIG. 3, of the first video image IM1 and the second video image IM2 formed by the first and second display devices 100A and 100B, respectively, the first video image IM1 formed by the first display device 100A can be moved in a direction indicated by an arrow A1 to allow the first video image IM1 to be visually recognized as an image displaced to the outside, that is to the right side, as illustrated in a lower row δ in FIG. 3. Note that in this case, as illustrated in FIG. 4, the second video image IM2 formed by the second display device 100B can be caused to be recognized as being directly in front, and the first video image IM1 formed by the first display device 100A can be caused to be recognized as being in a position displaced from the front to the right side. In this case, even if the display contents are mutually different for the right and left eyes, the images can be recognized in each of the right eye and the left eye, the images can be individually recognized without any fusion between them, and an amount of information can be increased.

In addition, in this case, by manually or automatically rotatingly moving the first display device 100A and the second display device 100B individually, the image required by the observer can be sifted and selected. For example, by rotating the video image for which the display position is to be changed by an angle that is equal to or greater than half the angle of view of the video image, both the images (both video images) can be sufficiently separated, and the images can be prevented from being recognized in a superimposed position. For example, in a case in which the angle of view (FOV) of the video image is 50°, by setting a range over which the display position can be changed to be 25° or greater, the left and right images can be sufficiently separated even when the angle of view is wide.

Hereinafter, with reference to a conceptual drawing illustrated in FIG. 5 and the like, several types of image processing for changing the display positions of the first video image IM1 and the second video image IM2 in modes other than those illustrated in FIG. 3 and FIG. 4 will be exemplified.

Figure 5:
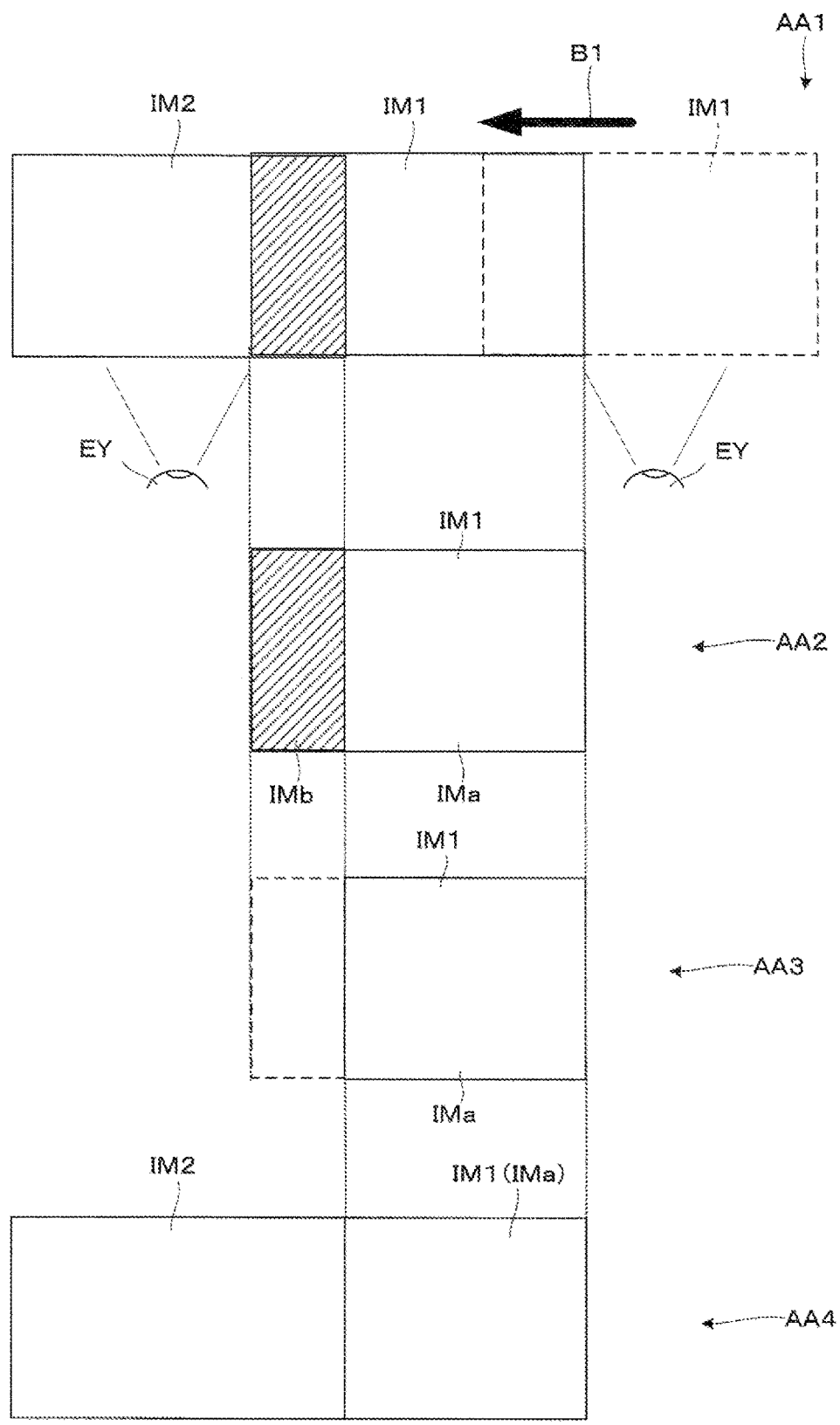
FIG. 5 is a conceptual diagram illustrating an example of image processing with respect to position changes of a first video image and a second video image.

First, FIG. 5 illustrates a case in which the first video image IM1 is moved in a direction indicated by an arrow B1 from a position indicated by dashed lines to a position indicated by solid lines, as illustrated in a first step AA1, and is moved toward the inner side, that is the left side, so as to be moved closer to the second video image IM2. In this case, as illustrated by a hatched region, a portion of the first video image IM1 visually recognized by a right eye EY and a portion of the second video image IM2 visually recognized by the left eye EY are recognized as images in a superimposed position (a superimposed range). To avoid such a situation, first, as illustrated in a second step AA2, the first video image IM1 is divided into a non-superimposed video portion IMa that is not superimposed on the second video image IM2, and a superimposed video portion IMb that is superimposed thereon. As illustrated in a third step AA3, the new video image IM1 is generated by deleting the superimposed video portion IMb and leaving only the non-superimposed video portion IMa. As illustrated in a fourth step (final step) AA4, the second video image IM2 and the first video image IM1 are displayed in this state. In other words, the display control unit 150 performs various processes to block the video portion of the first video image IM1, among the first video image IM1 and the second video image IM2, in the superimposed video portion IMb, which is the superimposed range of the display position of the first video image IM1 and the display position of the second video image IM2. Note that in this case, the second video image IM2 formed by the second display device 100B is caused to be recognized as being directly in front, and the first video image IM1 formed by the first display device 100A is caused to be recognized as being in a position displaced from the front position to the right.

Note that the processing method described above is an example, and it is also conceivable to delete a portion of the second video image IM2, as opposed to the case described above. In addition, the side to be deleted may be determined on the basis of various settings such as, for example, which is the dominant eye of the observer, and which side is the main image. Furthermore, in the processes described above, a certain margin may be imparted to the range to be deleted. This is because, for example, when the display content in the left and right images is different, it is not necessary to adjust the image to the left and right eyes in pixel units in order to cause an image common to both the left and right eyes to be visually recognized.

Figure 6:
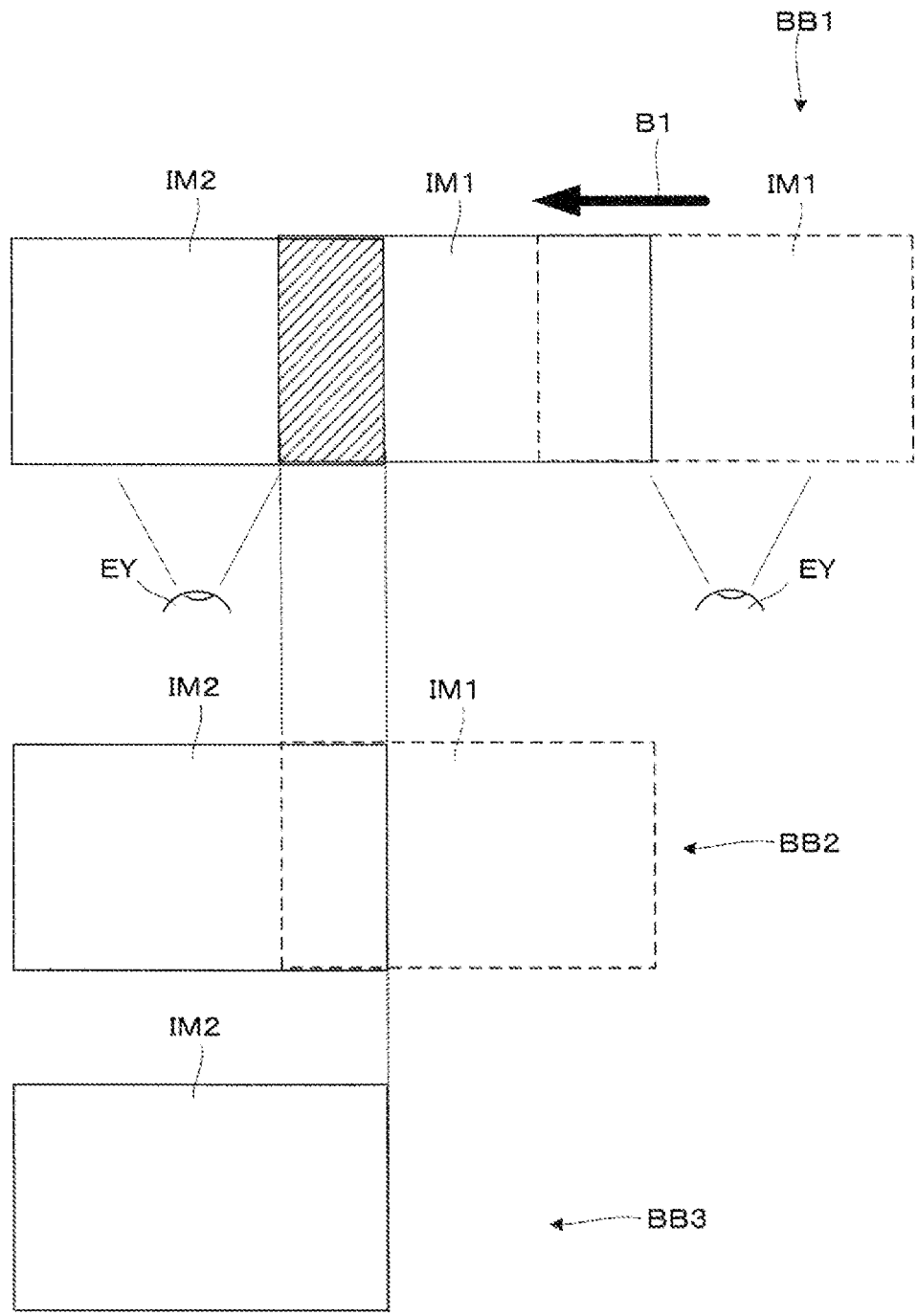
FIG. 6 is a conceptual diagram illustrating another example of the image processing with respect to position changes of the first video image and the second video image.

Further, as illustrated in another mode in FIG. 6, it is also conceivable to perform various processes so as to block the entirety of one of the first video image IM1 and the second video image IM2. In other words, a mode may be adopted in which, as in the case of the first step AA1 in FIG. 5, when a location occurs in a first step BB1 that is recognized as an image in the superimposed position (the superimposed range), as illustrated in a second step BB2, the entirety of the first video image IM1 is deleted, and, as illustrated in a third step BB3 (a final step), only the second video image IM2 is displayed.

Note that, in a case of the mode in which one of the images is deleted, as described above, it is conceivable to adopt an organic EL as a light source of the video image light for forming the first video image IM1 and the second video image IM2 in the first and second display devices 100A and 100B. By using the organic EL, black floating of the portion to be blocked can be avoided, and an appropriate image can be deleted.

Figure 7:
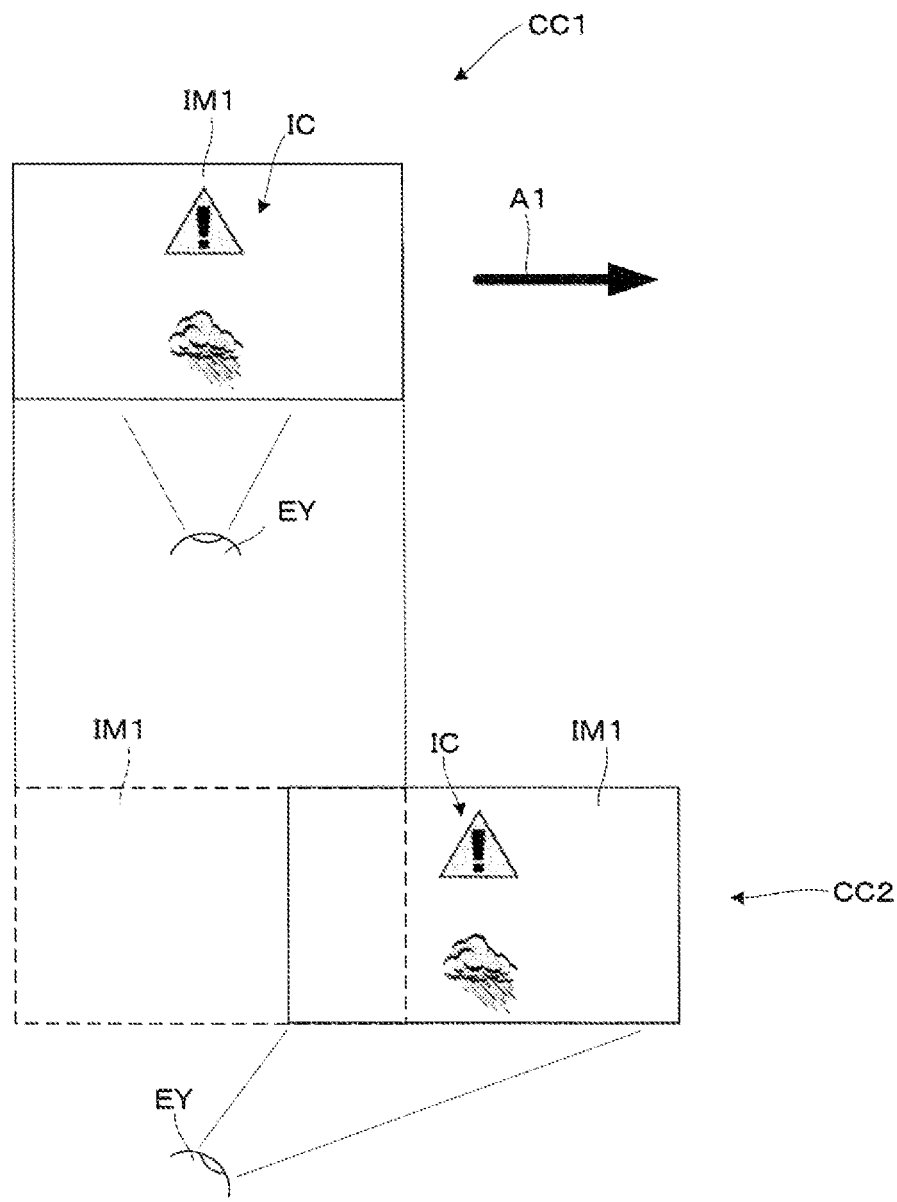
FIG. 7 is a conceptual diagram illustrating an example of operations in a display content maintaining mode in which display content is maintained even when a display position is changed.

Further, for example, the content to be displayed may be changed in accordance with the mode to be used for the video image. Specifically, a control mode may be changed according to a display content change mode for changing the display content in conjunction with the display position change of the video image, and to a display content maintaining mode for maintaining the display content regardless of the display position change. FIG. 7 is a conceptual diagram illustrating an example of operations in the display content maintaining mode in which the display content is maintained even when the display position is changed, and FIG. 8 is a conceptual diagram illustrating an example of operations in the display content change mode in which the display content is changed in conjunction with the display position change of the video image.

First, in one example in FIG. 7, the display content projected within a display frame of the first video image IM1 is maintained before and after the movement of the display position. Specifically, first, in a first display state CC1, it is assumed that an image of precaution information, a weather forecast or the like is displayed as the display content in the vicinity of the center of the first video image IM1, which is disposed directly in front, as an icon image IC, for example. The first video image IM1 that is in the display position and has the display content of this type is moved in the direction of the arrow A1, and in a case as illustrated in a second display state CC2, that is, in a case in which the display position of the first video image IM1 is caused to be visually recognized as the image displaced to the outside, that is to the right side, a state is maintained in which the same icon image IC is displayed in the same position within the display frame of the first video image IM1 at the location to which it has moved.

Figure 8:
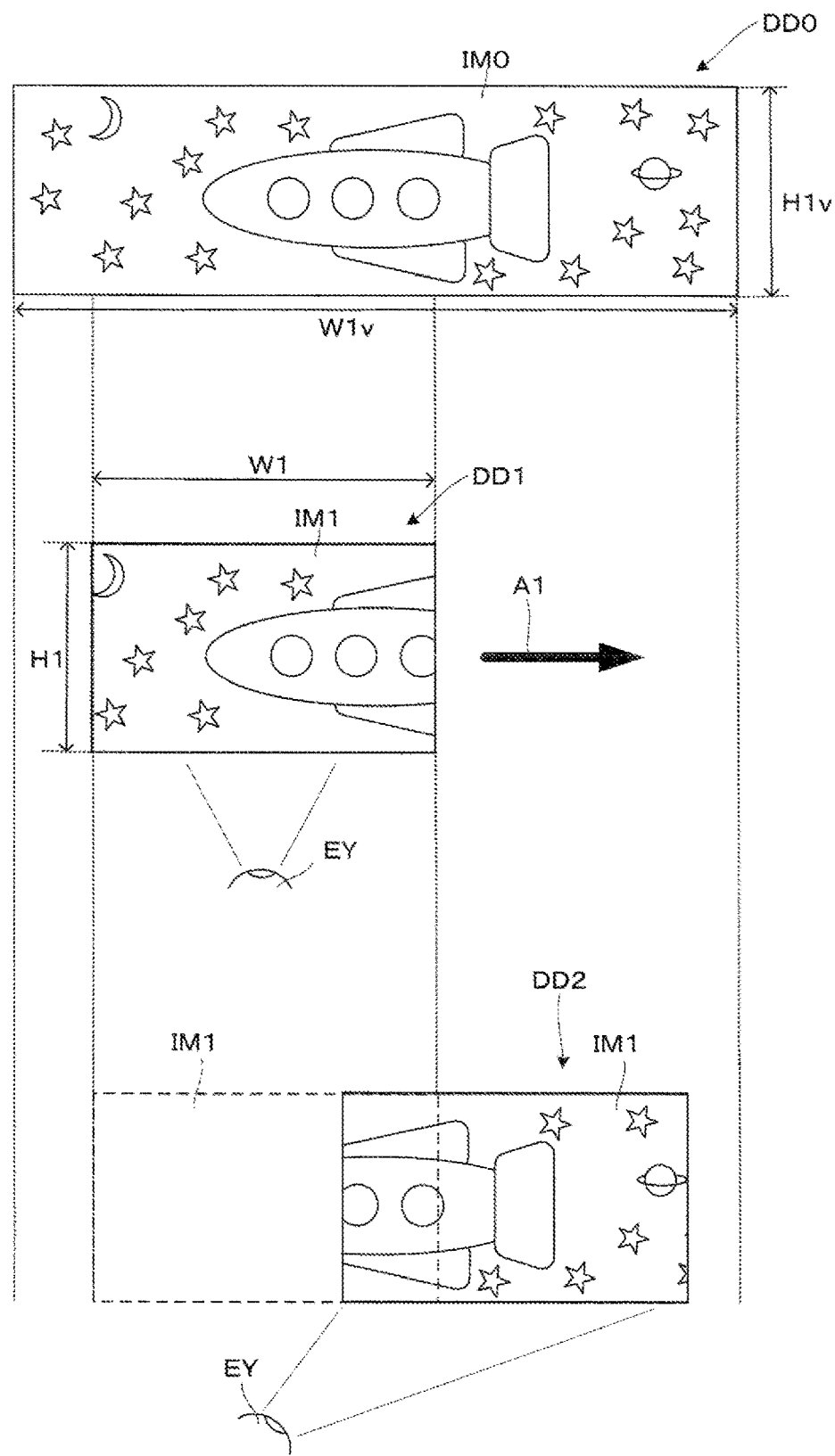
FIG. 8 is a conceptual diagram illustrating an example of operations in a display content change mode in which display content is changed in conjunction with a display position change of a video image.

On the other hand, in an example in FIG. 8, the display content is changed in accordance with the movement of the display position. Specifically, first, in FIG. 8, a prepared graphic DD0 illustrates an example of graphic data illustrating a whole object to be displayed, as a prerequisite preparation. Here, as illustrated, an image IM0 in the prepared graphic DD0 has a shape that is long in a movement direction, that is, is horizontally long. In terms of a relationship with the first video image IM1, a horizontal/vertical aspect ratio W1v/H1v of the image IM0 is greater than a horizontal/vertical aspect ratio W1/H1 of the first video image IM1. Thus, for example, in a first display state DD1, a central part of the image IM0 is displayed as the display content in the first video image IM1 that is disposed directly in front. In contrast, in a case in which the image IM0 is moved in the direction of the arrow A1 and is in a second display state DD2, a portion closer to the right edge of the image IM0 is displayed. In other words, the display content projected in the display frame of the first video image IM1 changes in accordance with the movement of the display position. In particular, in the one example in FIG. 8, the display control is performed so that the horizontally long image IM0 can be visually recognized as if it were fixed in a virtually predetermined space on the video image (a virtual video image display space). In other words, in the one example in FIG. 8, the display content is changed so as to maintain the positional relationship of the display content in the virtual video image display space, and the image content is changed such that, with respect to the portion of the image IM0 illustrated in the prepared image picture DD0, a section that can be viewed seems to change along with the movement of the display position.

Note that, additionally, in the mode in which the icon image IC is displayed as illustrated in FIG. 7, for example, the display content may be changed in accordance with the movement of the display position. In other words, in FIG. 7, an icon image displayed in the first display state CC1 and an icon image displayed in the second display state CC2 may be different.

Further, with respect to the display content, in addition to the icons and the content of the various video images such as those described above, various objects are included as target content, and, in addition to separated display and placement change, various display modes and changes thereof for the content to be displayed may include cutting out the display region, or changing a color or shape, and the like. In addition, with the differences in these modes, it is also possible to consider the display contents as being different from one another.

Note that various types of image processing as described above with reference to FIG. 5 to FIG. 8 are examples, and it is conceivable to implement various other display modes.

Figure 9:
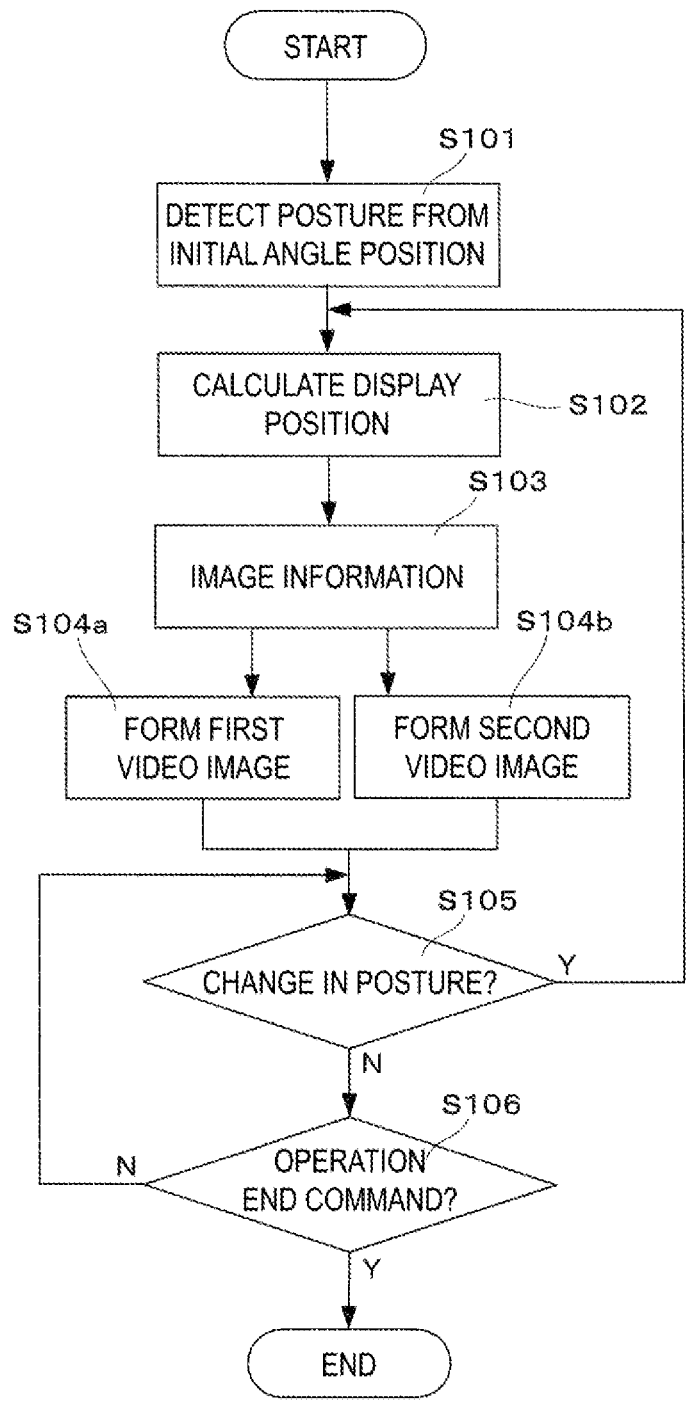
FIG. 9 is a flowchart for describing an example of display control.

An example of the display control of the head-mounted display device 100 will be described below with reference to a flowchart in FIG. 9. In particular, an example of operations relating to display position changes will be described.

First, when the main body 100p is activated by communication from the control device CR, the display control unit 150 checks the posture of the first and second display devices 100A and 100B in an initial state, from the detection results of the angle position sensor AS and the like (step S101). Next, the display control unit 150 calculates the display positions of the first video image IM1 and the second video image IM2 on the basis of the detection result at step S101 (step S102), and generates image information to be output on the basis of the calculation result (step S103). Note that at step S103, the display control unit 150 generates and transmits the image information VV1 for the right eye, that is for the first display device 100A and the image information VV2 for the left eye, that is for the second display device 100B. When the image information VV1 and VV2 generated in the display control unit 150 are transmitted, a drive circuit of an image display device 10A operates accordingly in the first display device 100A, and the image formation of the first video image IM1 is performed (step S104a). Similarly, in the second display device 100B, a drive circuit of an image display device 10B operates and the image formation of the second video image IM2 is performed (step S104b). As described above, when the display operation by the first and second display devices 100A and 100B is started, the display control unit 150 of the control device CR again confirms the posture of the first and second display devices 100A and 100 B from the detection results of the angle position sensor AS and the like (step S105). In other words, the display control unit 150 checks the presence or absence of a change in the posture of the first and second display devices 100A and 100B. At step S105, in a case in which the change in posture is confirmed (step S105: Yes), the display control unit 150 again performs the operation from step S102 and transmits the newly generated image information VV1 and VV2. On the other hand, at step S105, when no change in the posture is confirmed (step S105: No), the display control unit 150 checks the presence or absence of an end command to end the display operation (step S106). When, at step S106, there is no end command to end the display operation (step S106: No), the checking of the posture of the first and second display devices 100A and 100B is continued, and when, at step S106, there is the end command to end the display operation (step S106: Yes), the series of operations is ended.

Note that in the above-described series of operation processes, for example, the calculation at step S102 is performed in the display position calculating unit 150p, and the generating of the image information (the image data) on the basis of the calculation result at step S103 is performed in the image data generating unit 150q. At this time, when it is found that there is the superimposed range between the first video image IM1 and the second video image IM2, for example, from the calculation results of the display position calculating unit 150p for the first and second display devices 100A and 100B, in the image data generating unit 150q, processing or the like to delete part or all of the image for one of the first video image IM1 and the second video image IM2 is performed, for example. When these pieces of information are stored in the display position data storage unit 120p or the generated image data storage unit 120q and a continuous image is provided, these pieces of information are reflected and sequentially processed for each of frame images configuring the continuous image.

Hereinafter, a specific configuration example of the head-mounted display device 100 that can change the display position by having the posture adjustment mechanism as described above will be described with reference to FIG. 10. Note that in FIG. 10, only the optical system, such as the first display device 100A, a lens tube BR that houses the optical system, and a frame portion FR that supports the optical system are illustrated, and other portions are not illustrated.

Figure 10:
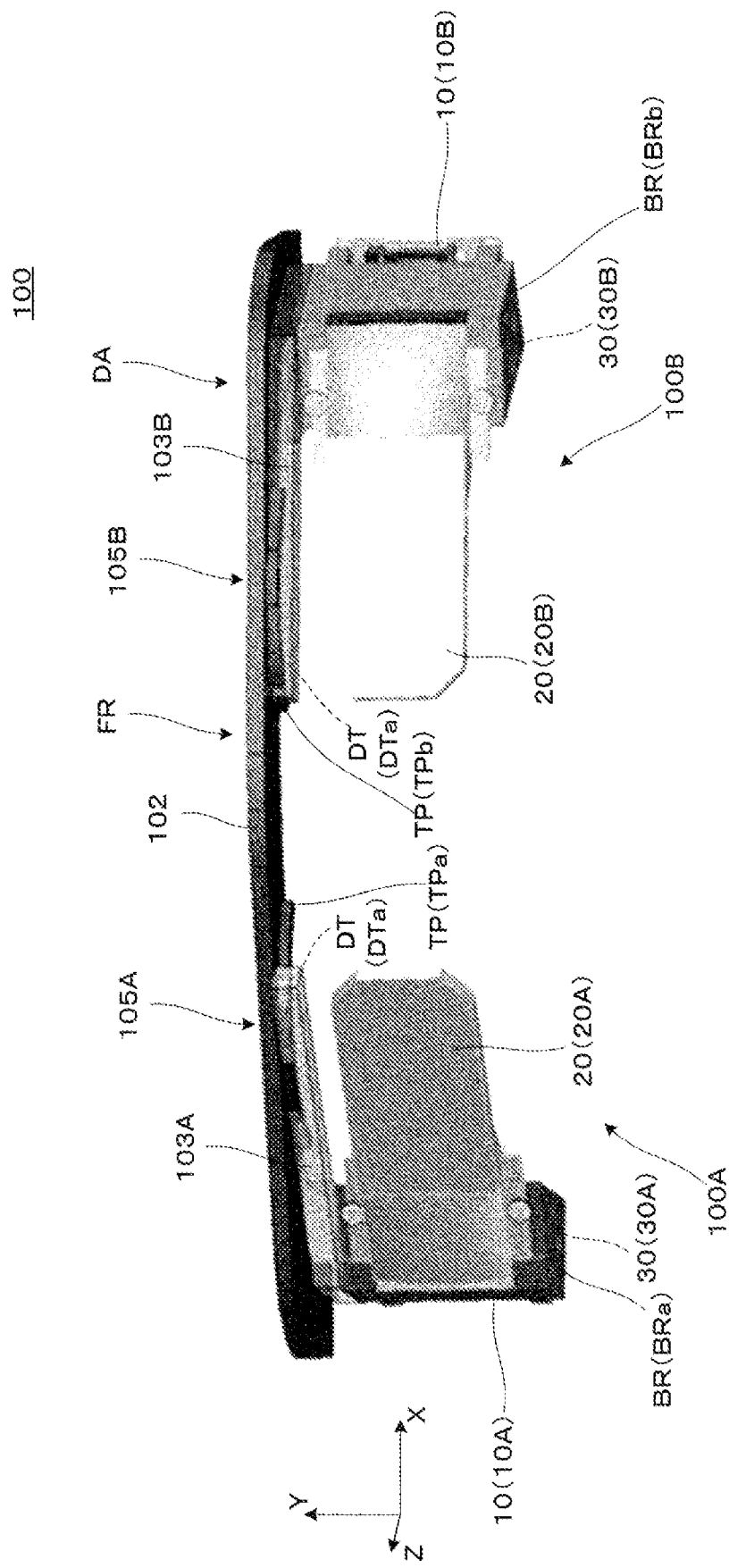
FIG. 10 is a schematic perspective view illustrating an example of a display optical system of the head-mounted display device.

Of the components of the head-mounted display device 100 in the FIG. 10, first, the first display device 100A and the second display device 100B are portions that respectively form a virtual image for the left eye and the right eye, and are respectively configured by the light-guiding device 20 that covers the front of the eyes of the observer, as well as an optical system for image formation, such as an image display device (video element) 10, a projection lens 30, and the like. Further, the image display device 10, the projection lens 30, and the light-guiding device 20 are in a state of being integrally assembled with the lens tube BR that houses the optical elements configuring the projection lens 30. For example, the image display device 10A, a projection lens 30A, and a light-guiding device 20A that configure the first display device 100A are fixed while maintaining an arrangement relationship with each other by a lens tube BRa. Similarly, the image display device 10B, a projection lens 30B, and a light-guiding device 20B that configure the second display device 100B are fixed by a lens tube BRb.

Next, of the head-mounted display device 100, the frame portion FR includes a main frame 102 and a pair of left and right first and second subframes 103A and 103B.

Of the frame portion FR, the main frame 102 is a long thin member that is bent into a U-shape in plan view, and is provided connected to both the pair of the left and right first display device 100A and second display device 100B via the first and second subframes 103A and 103B. When the observer is wearing the head-mounted display device 100, the main frame 102 is maintained in a fixed state with respect to the observer, and supports the first display device 100A and the second display device 100B.

Of the frame portion FR, the pair of left and right first and second subframes 103A and 103B are plate-like members and are movably engaged with the main frame 102 that is fixed to the observer side when worn. More specifically, the first posture adjustment mechanism 105A is provided between the main frame 102 and the first subframe 103A as a connecting mechanism that rotatably fits along a groove provided in an arc shape. Similarly, the second posture adjustment mechanism 105B is provided between the main frame 102 and the second subframe 103B. Note that the first and second posture adjustment mechanisms 105A and 105B that are the connection mechanisms are described in detail below. Meanwhile, the first and second subframes 103A and 103B are respectively connected to and support and fix the corresponding first and second display devices 100A and 100B.

According to the configuration described above, when the head-mounted display device 100 is being worn, the first and second display devices 100A and 100B are supported by the frame portion FR and can rotate.

Note that, in the drawings, a Z direction indicates a front-facing direction when the head-mounted display device 100 is being worn, and is a direction defined with reference to the main frame 102 that is fixed when worn, for example. In addition, in an in-plane direction perpendicular to the Z direction, that is, the in-plane direction of a plane having the Z direction as the normal direction, the horizontal direction in which the eyes are aligned side by side is denoted by an X direction and the vertical direction is denoted by a Y direction. As a typical example, when the first and second display devices 100A and 100B are installed and fixed in a standard position in which the image is projected to the front by the first and second posture adjustment mechanisms 105A and 105B, a case is assumed in which the Z direction indicates the normal direction of a surface of an eyebox for the display devices 100A and 100B, and the surface of the eyebox is a surface that is formed by an X direction vector and a Y direction vector. Further, in this case, as an example, a case is assumed in which the first and second display devices 100A and 100B are rotated along the alignment of the eyes. In other words, with the Y direction as the axial direction, the first and second display devices 100A and 100B are rotated in the XY plane. A center of rotation at this time is the center of the observer's pupil.

The configuration of each component of the first display device 100A and rotation operation of the first display device 100A will be described below with reference to a bottom surface view illustrated in FIG. 11. Note that the second display device 100B is the same as the first display device 100A, and illustrations and descriptions thereof are thus omitted here.

The first display device 100A is a device for causing the first video image to be displayed for the right eye. As described above, the first display device 100A is a display optical system that forms an image to be visually recognized, as a result of including the image display device 10A, that is, the image display device 10, the projection lens 30A, that is, the projection lens 30, and the light-guiding device 20A, that is, the light-guiding device 20. Furthermore, each of these components is integrated by being assembled with the lens barrel BRa, that is the lens barrel BR.

The image display unit 10 (the image display unit 10A) can be formed by an image display element (a video element) configured by a self-emitting light emitting element, such as an organic EL element, for example. Further, in addition to the image display element (the video element) that is a transmissive spatial light modulating device, for example, a configuration may be employed that includes an illumination device (not illustrated) that is a backlight for emitting illumination light onto the image display element, and a drive control unit (not illustrated) that controls operations.

The projection lens 30 (the projection lens 30A) is a projection optical system including, as structural components, a plurality of optical elements (lenses) (three lenses L1 to L3 in the example in FIG. 13 described below, for example) that are arranged along an incident side optical axis, for example, and these optical elements are housed and supported by the lens tube BR as described above. Note that the optical elements can form an intermediate image corresponding to the display image inside the light-guiding device 20 in cooperation with the light-guiding device 20, by configuring an aspherical lens including both an axially non-symmetric aspherical surface (non-axisymmetric aspherical surface) and an axially symmetric aspherical surface (axisymmetric aspherical surface). The projection lens 30 projects the video image light formed by the image display device 10 toward the light-guiding device 20 and causes it to be incident on the light-guiding device 20.

The light-guiding device 20 (the light-guiding device 20A) is a light guiding member or a light-guiding optical system that guides the video image light from the projection lens 30 to in front of the eyes of the observer by emitting, while also internally reflecting, the video image light.

The lens barrel BR (the lens cylinder BRa) is a cylindrical member that houses the optical elements (the lenses) that configure the projection lens 30. The image display device 10 is assembled to the light incident side of the projection lens 30, and the light-guiding device 20 is assembled to the light emission side of the projection lens 30. As a result, the components configuring the first display device 100A are integrated by the lens barrel BR (the lens barrel BRa).

Further, here, the normal direction of a light emitting surface 11a, which is an image surface of the image display device 10, is referred to as a z direction, and the z direction is aligned with an optical axis direction in which the optical axis of the projection lens 30 extends. In addition, in the in-plane direction of the light emitting surface 11a perpendicular to the z direction, one direction of the rectangular light emitting surface 11a or the image display device 10 is an x direction, and a direction perpendicular to the x direction is a y direction. Note that, here, the longitudinal direction of the rectangle is the x direction. Furthermore, in this case, the Y direction and the y direction, which are the vertical direction, are the same direction.

Further, as described and illustrated above, the first display device 100A is attached to the first subframe 103A in an upper portion (+Y side) of the lens barrel BRa. In this way, the first display device 100A is capable of rotating and moving in a plane perpendicular to the Y direction or the y direction along with the first subframe 103A with respect to the main frame 102, while maintaining overall optical positional relationships.

Further, the above also holds true for the second display device 100B. In other words, the second display device 100B is rotated by the second posture adjustment mechanism 105B with reference to the main frame 102 that is fixed with respect to the observer when the head-mounted display device 100 is worn.

In other words, with reference to the main frame 102 fixed with respect to the observer when the head-mounted display device 100 is worn, the first and second posture adjustment mechanisms 105A and 105B rotationally move the first and second display devices 100A and 100B, where an axial direction is the normal direction (the Y direction or the y-direction) of the horizontal plane (an XZ surface or an xz surface) that includes the horizontal direction (the X direction) in which the eyes of the observer are aligned side by side at a time of observation.

Hereinafter, with reference to FIG. 10 and FIG. 11, an example of the configuration of the posture adjustment mechanism for performing the rotational movement described above, that is, the configuration of the first and second posture adjustment mechanisms 105A and 105B, will be described.

First, as described above, the first subframe 103A attached to the first display device 100A illustrated in FIG. 10 and the second subframe 103B attached to the second display device 100B illustrated in FIG. 10 are each separately rotatable by the the first and second posture adjustment mechanisms 105A and 105B. For example, in an example in FIG. 11, a state is illustrated in which a display region is changed by changing an emission angle of the image light from a state in which the first display device 100A is emitting the imaging light to form a video image centered in the front-facing direction, that is, a standard front-facing direction for the observer. Similarly, the second display device 100B illustrated in FIG. 10 is independently formed.

Figure 11:
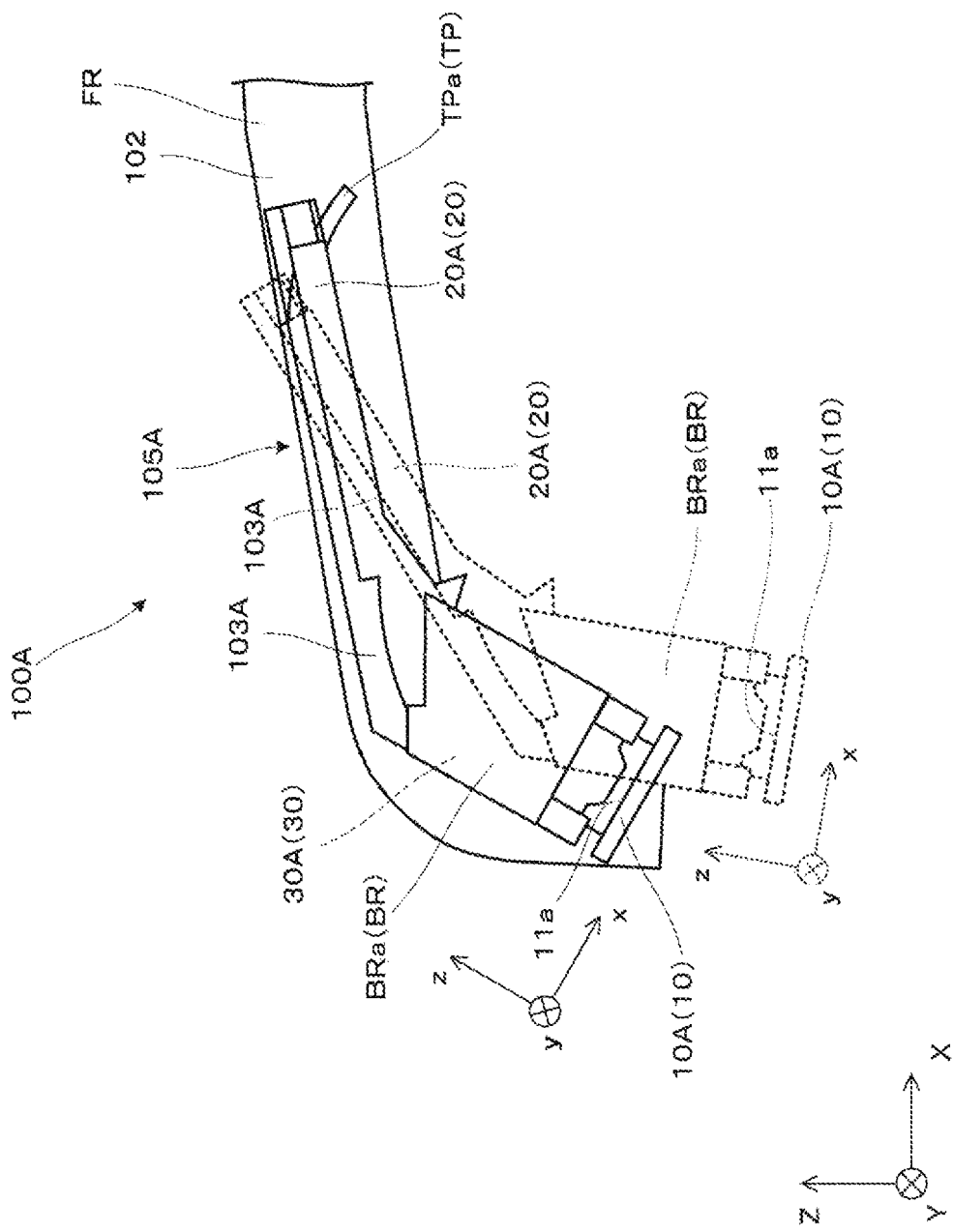
FIG. 11 is a bottom surface view for describing a rotational movement of a first display device.

As illustrated in FIG. 10 and FIG. 11, protruding portions TP are provided on the main frame 102 to form the first and second posture adjustment mechanisms 105A and 105B described above. Here, a pair of arc-shaped protruding portions TPa and TPb are provided as the protruding portions TP. On the other hand, the first and second subframes 103A and 103B are provided with grooves DT corresponding to the protruding portions TP. Here, a pair of groove portions DTa and DTb having a shape corresponding to the protruding portions TPa and TPb are provided as the grooves DT. In other words, the first posture adjustment mechanism 105A is configured by fitting together the protruding portion TPa and the groove DTa, and the second posture adjustment mechanism 105B is configured by fitting together the protruding portion TPb and the groove DTb. Note that a stopper face may be provided in one end of the arc-shaped groove portion DTa, for example, and a movement range of the first subframe 103A and the second subframe 103B may be regulated. By having the stopper face, for example, the first subframe 103A may be able to move the position of the image further to the outside (−X side), but not to the opposite, that is, the inner side (+X side). Similarly, the second subframe 103B may be able to move the position of the image further to the outside (+X side), but not to the opposite, that is, the inner side (−X side).

Hereinafter, changes in the visual perception on the observer side due to rotation operations such as those described above will be described with reference to FIG. 12 and the like.

Figure 12:
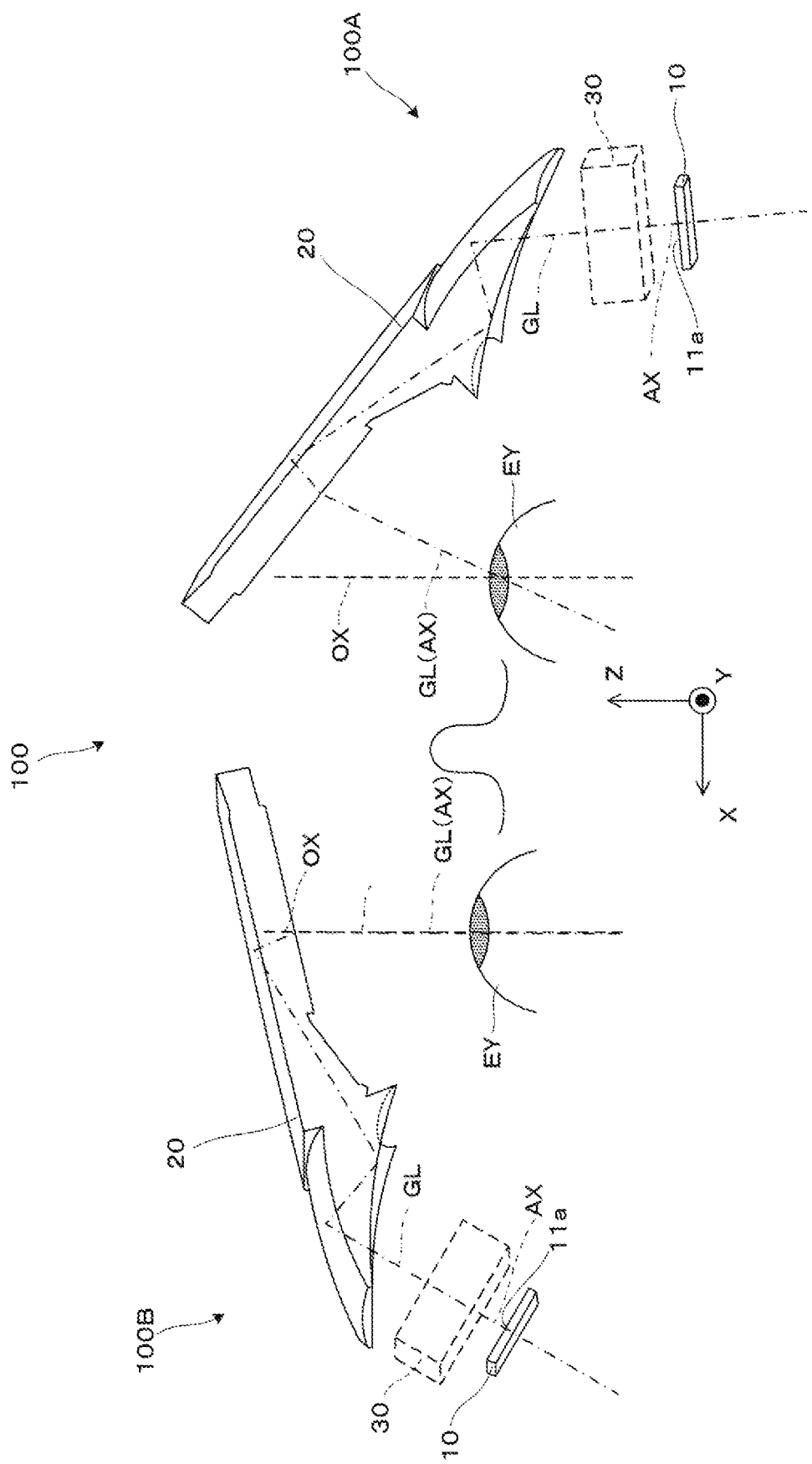
FIG. 12 is a conceptual diagram for describing the emission of image light to an observer by the first and a second display devices.
Figure 13:
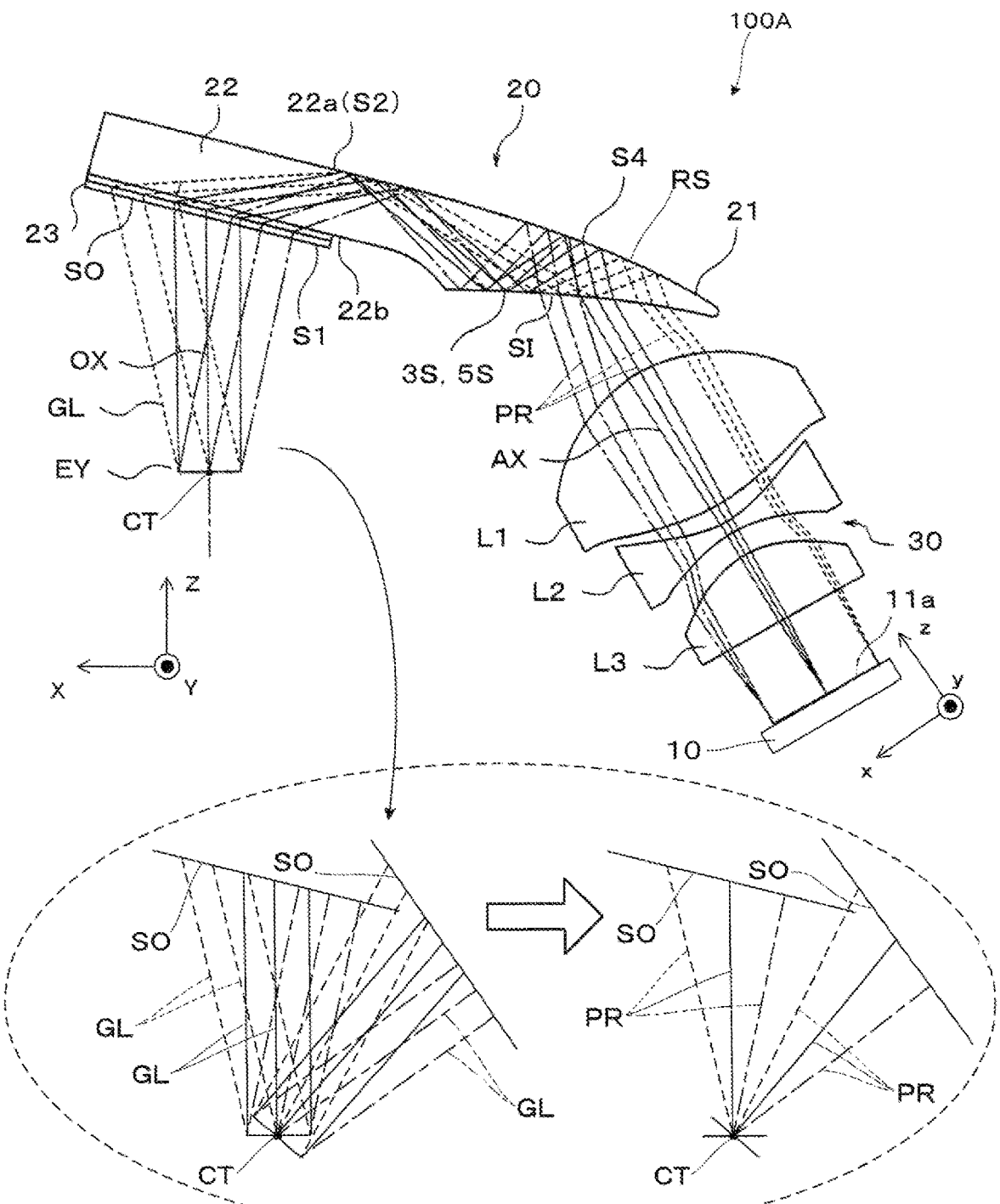
FIG. 13 is a conceptual diagram for describing changes in an emission angle of the image light to the observer by the first display device.

FIG. 12 is a conceptual diagram for describing the emission of image light GL to the observer by the first and second display devices 100A and 100B, and FIG. 13 is a conceptual diagram for describing changes in an emission angle of the image light GL to the observer by the first display device 100A.

In the example in FIG. 12, the image formation centered on the Z direction, that is, the front-facing direction for the observer, is maintained for the second display device 100B, while the first display device 100A is in a rotated state. In this case, an optical axis AX that is an emission axis for emitting the image light GL in the second display device 100B is in a state of being aligned with an optical axis OX having as its reference the eye EY of the observer. On the other hand, the optical axis AX that is the emission axis in the first display device 100A is in a state of being inclined to the outside (−X side) with respect to the optical axis OX. In this case, the second video image from the second display device 100B is recognized by the observer as a left-right symmetric image centered on the front-facing direction, while the first video image from the first display device 100A is recognized as an image that is displaced to the outside, that is, to the right side.

Hereinafter, the optical path of the image light GL in the first display device 100A will be described with reference to FIG. 13, and the principle for making the visual perception as described above will be described.

First, the configuration of each component of the first display device 100A will be described as a prerequisite to the description of the optical path of the image light GL. As illustrated, in the example here, of the first display device 100A, the projection lens 30 is configured by the three lenses L1 to L3. Further, the light-guiding optical system 20 includes an incidence part 21 that captures the image light GL, a parallel light guide body 22 for guiding the light, and an emitting part 23 for emitting the image light.

The incidence part 21 is arranged at the ear side of the observer, and the emitting part 23 is arranged at the nose side of the observer. The main bodies of the parallel light guide 22 and the incidence part 21 are molded into an integrated part or a single member by a resin material having high light transmissivity.

The incidence part 21 has a light incidence surface S1 configured to capture the image light GL from the projection lens 30, and a reflection surface RS that reflects the captured image light GL and guides the image light GL into the interior of the parallel light guide body 22. The light incidence surface S1 is formed by a convex curved surface on the projection lens 30 side, and also has a function of totally reflecting, on the inner surface side, the image light GL reflected by the reflection surface RS. The reflection surface RS is formed by a convex curved surface on the projection lens 30 side. The reflection surface RS is formed by performing film formation, such as aluminum evaporation, on the curved surface, reflects the image light GL entering from the light incidence surface SI, and bends the light path in a predetermined direction. The inner side of the light incidence surface S1 totally reflects the image light GL reflected by the reflection surface RS, and bends the light path in a predetermined direction. Note that the curved surface forming each surface is a non-axisymmetric free curved surface, but is not limited thereto, and can be an axisymmetric free surface, a spherical surface, a non-spherical surface, or the like. Further, each of the curved surfaces can assist a collimation function by the projection lens 30.

The parallel light guide body 22 is a flat plate portion, and has two planes 22a and 22b facing each other that form a pair of surfaces extending in parallel. Since both of the planes 22a and 22b are parallel planes, the external image is not magnified and a focus is not shifted. In the parallel light guide body 22, the one plane 22a functions as a total reflection surface that totally reflects the image light from the incidence part 21, and has a role of guiding the image light to the emitting part 23, with a minimum loss. The plane 22b on the back side forms a boundary surface between the parallel light guide body 22 and the emitting part 23.

The emitting part 23 is a member that is formed in layers on an extension along the plane 22b at the back side, on a far side of the parallel light guide body 22, that is, on the nose side of the observer, and includes a reflection unit formed by arranging a plurality of mirrors having light transmissivity. As a result, while allowing the passage of the image light GL that is totally reflected at the plane 22a on the outside forming the total reflection surface of the parallel light guide body 22, the emitting part 23 reflects the incident image light GL at a predetermined angle and bends the incident image light GL to the light emitting surface SO side.

Note that each optical surface of the light-guiding optical system 20 on the light path is set sequentially from the downstream of the light path, as described below. First of all, the plane 22b of the parallel light guide body 22 or the light emitting surface SO is set as a first surface S1, and the plane 22a is set as a second surface S2. Next, the light incidence surface S1 of the incidence part 21 is set as a third surface S3 when considered to be a reflection surface through total reflection. In addition, the reflection surface RS of the incidence part 21 is set as a fourth surface S4. Finally, the light incidence surface S1 is set as a fifth surface S5 when considered to be a surface that captures light.

Next, an operation of the image formation in the first display device 100A illustrated in FIG. 13 along the light path of the image light GL will be described briefly.

First, the image light GL emitted from the light emitting surface 11a of the image display device 10 is emitted toward the light-guiding device 20 after passing through the projection lens 30 configured by the three lenses L1 to L3. The image light GL is incident from the fifth surface S5 of the light-guiding device 20, is reflected by the fourth surface S4, is further totally reflected on each of the third surface S3 and the second surface S2, and reaches the first surface S1. Then, the image light GL is emitted toward the eyes EY of the observer while being bent. Specifically, the image light GL reaches the eyes EY of the observer by being guided by the light-guiding device 20. When reaching the position of the eyes EY, each component of the image light GL is a parallelized bundle of rays, and is incident while being superimposed at the position of the eyes EY. The observer identifies the image position by means of the incident direction or incident angle of light, and visually recognizes the virtual image. In this case, the cross-sectional shape of each of the bundle of rays superimposed at the position of the eyes EY becomes an eye ring shape, and a diameter thereof becomes an eye ring diameter. In the present embodiment, the location of this eye ring shape is also referred to as the eyebox.

As a result of the type of configuration described above, the image light GL from the image display device 10 is reliably guided to in front of the eyes of the observer.

Note that in the case of the above-described configuration, by providing a free curved surface on some of the first surface S1 to the fifth surface S5, a load on the projection lens 30 can be reduced, and as a result the optical system can be made thinner. Further, during the optical design, by following the light path in an order that is the reverse of the above, that is, in an order starting from the first surface S1 with the position of the eyes EY as the first reference, the settings of each part are made.

Here, in the case of the virtual image in the above-described type of mode, when the visual perception is changed, by changing the emission angle of the image light GL such that the eyebox (the eye ring shape) does not go outside a range assumed as the position of the eyes of the observer at the time of being worn, the image position at which the virtual image is visually recognized can be changed. Here, in the present embodiment, as a result of the first display device 100A being rotatingly movable taking, as a center of rotation, a center point CT of the position of the eyes EY, that is, the eye ring shape (or the eyebox), which is a point through which a principal ray of the image light GL from each of points of the light emitting surface 11a passes, and is a point that is an ideal center of the pupil of the observer, the position change of the first video image formed by the first display device 100A is possible. In the drawings, as illustrated by partial enlargement, by rotating the first display device 100A, the orientation of the light emitting surface SO changes, but at that time, as illustrated by the right side in the partially enlarged diagram, the posture of the first display device 100A is adjusted such that, with respect to a principal ray PR of the image light GL of the first video image that is the target of the display position change, the angle is changed while maintaining its passage through the center point CT that is the center position of the eyebox. The rotation operation as described above is realized by the first posture adjustment mechanism 105A illustrated in FIG. 11 and the like.

Specifically, the operation for changing the display content and the like described with reference to FIG. 7 and FIG. 8 can be realized by performing the posture adjustment operation as described above, for example. In other words, by performing the movement (the content change) of the display image in accordance with the posture adjustment that is performed such that the angle is changed while maintaining the passage through the center point that is the center position of the eyebox, the display mode illustrated in FIG. 7 and the like, or the change in the display mode can be realized.

As described above, in the head-mounted display device 100 of the present embodiment, in the right and left pair of the first display device 100A and the second display device 100B that configure the display mechanism DA, the first video image IM1 and the second video image IM2 having the mutually different display contents can be visually recognized. Further, the first and second posture adjustment mechanisms 105A and 105B that are the posture adjustment mechanism allow the display position of the first video image IM1 and the second video image IM2 to be changed. In addition, by the display control unit 150 controlling the display content in accordance with the change in the display position of at least one of the first video image IM1 and the second video image IM2, an optical performance and miniaturization can be maintained while increasing a displayed information amount by separately displaying various information, in comparison to a case in which an image of a single size is visually recognized by both eyes, for example.

Further, in the above description, of the head-mounted display device 100, if attention is paid to the main body 100p, the main body 100p is provided with the right and left pair of the first display device 100A and the second display device 100B, and is a display optical system for the head-mounted display device in which the information relating to the display position change in the first display device 100A and the second display device 100B is output to the display control unit that controls the display content.

Further, in the above description, of the head-mounted display device 100, if attention is paid to the control device CR, the control device CR is a control device for the head-mounted display device in which, on the basis of the information relating to the display position change from the first display device 100A and the second display device 100B, the display content is generated and output to the right and left pair of the first display device 100A and the second display device 100B.

Further, as another control mode relating to the display operation, in order to cause both of images (both video images) to be sufficiently separated, and prevent the images from being recognized in the superimposed position, it is conceivable to limit a range over which the movement of the first and the second posture adjustment mechanisms 105A and 105B is allowed. For example, the display position of the first video image IM1 and the display position of the second video image IM2 may be maintained in a state of being separated, and in particular, both the first display device 100A and the second display device 100B may display the first video image IM1 and the second video image IM2 in a display position other than the front-facing position. In this case, even if a situation arises in which, even though there are circumstances in which the observer wishes to view the external world, such as in an emergency, each of the display devices 100A and 100B remain completely illuminated due to a malfunction, for example, it is possible to secure the external world view at the front position. Various determinations can be made for the range of the external world in the emergency or the like, and various settings are conceivable in accordance with operations performed while using the head-mounted display device 100. For example, when performing an operation concentrating on a single point, it is conceivable to make settings such that only a directly front-facing range of a relatively narrow front view is secured. However, when watching a PC screen or reading a book, it is conceivable that it may be necessary to provide a non-display range to the front, to an extent that a visual field can be secured for a range over which the line of sight moves in these operations. Further, a range of an angle at which a human being can observe at a high resolution, such as approximately 5°, that is, a range of a few degrees may be set as the front position, and the display position may be set that is outside this range. Note that, in this case, the posture adjustment is made that involves the change of the display content or the like as described above, in the display position other than the front position.

Note that, in order to enable the operation as described above, in the posture adjustment, it is conceivable to have a configuration in which it is possible for the first display device 100A to move the emission position of the image light GL further to the outside (−X side) than the front position, but the image light GL cannot be moved to the opposite side, that is, to the inner side (+X side). On the other hand, it is conceivable to have a configuration in which it is possible for the second display device 100B to move the emission position of the image light GL further to the outside (+X side) than the front position, but the image light GL cannot be moved to the opposite side, that is, to the inner side (−X side). In the above-described manner, it is possible to cause the first image IM1 formed by the first display device 100A to be recognized in a position displaced to the right side from the front position, and cause the second image IM2 formed by the second display device 100B to be recognized in a position displaced to the left side of the front position.

Second Embodiment

Below, an example of a head-mounted display device according to a second embodiment will be described with reference to FIG. 14.

The head-mounted display device according to the second embodiment is a modified example of the head-mounted display device exemplified in the first embodiment, and is similar to the case described in the first embodiment apart from a mode relating to operation control, and thus, a description relating to the whole of the head-mounted display device is omitted.

Figure 14:
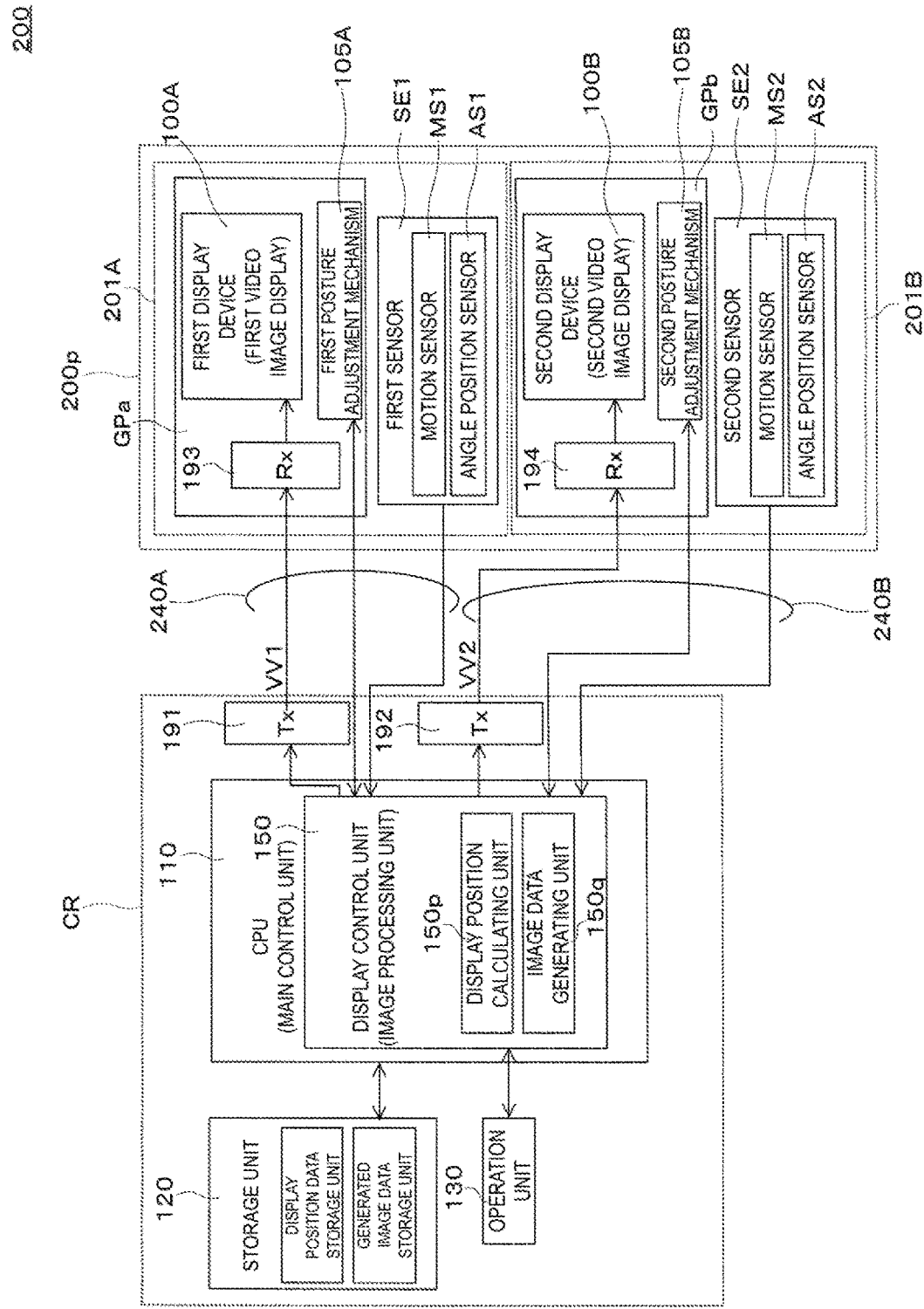
FIG. 14 is a block diagram for describing a control mechanism of the head-mounted display device according to a second embodiment.

FIG. 14 is a block diagram for describing a configuration example of a head-mounted display device 200 according to the second embodiment, and is a diagram corresponding to FIG. 2. In the example in FIG. 2 of the first embodiment, the control device CR is connected to the main body 100p by the single cable 40. In contrast to this, in the present embodiment, as illustrated in FIG. 14, first, a main body 200p that is a display optical system configuring the head-mounted display device 200 is divided into a first display optical system 201A including the first display device 100A for the right eye, and a second display optical system 201B including the second display device 100B for the left eye. In accordance with this, the control device CR is connected to each of the first display optical system 201A and the second display optical system 201B of the main body 200p, by two cables 240A and 240B.

Further, in this case, as illustrated, in addition to the first image forming unit GPa, the first display optical system 201A is provided with a first sensor SE1 configured by various sensors, such as a motion sensor MS1 and an angle position sensor AS1. Similarly, in addition to the second image forming unit GPb, the second display optical system 202A is provided with a second sensor SE2 configured by various sensors, such as a motion sensor MS2 and an angle position sensor AS2.

Note that in the illustrated example, the control device CR is respectively connected to the first display optical system 201A and the second display optical system 201B via the two cables 240A and 240B, but, for example, the control device CR and the first and second display optical systems 201A and 201B may exchange information via wireless communication (wireless communication) without communicating via a cable.

As described above, in the head-mounted display apparatus 200 according to the present embodiment also, mutually different display contents can be visually recognized as the first video image IM1 and the second video image IM2 in the first and second display devices 100A and 100B. The first and second posture adjustment mechanisms 105A and 105B, which are the posture adjustment mechanisms, allow the display positions of the first video image IM1 and the second video image IM2 to be changed. Furthermore, as a result of the display control unit 150 controlling the display content in accordance with the position change of at least one of the display position changes of the first video image IM1 and the second video image IM2, the optical performance and the miniaturization can be maintained while increasing a displayed information amount by separately displaying various information, in comparison to a case in which an image of a single size is visually recognized by both eyes, for example. Furthermore, in the present embodiment, the display control can be performed by separating the main body unit 200p on the mounting side into the first display optical system 201A and the second display optical system 201B and respectively performing communication therewith.

Third Embodiment

Below, an example of a head-mounted display device according to a third embodiment will be described with reference to FIG. 15.

The head-mounted display device according to the present embodiment is a modified example of the head-mounted display device exemplified in the first embodiment, and is similar to the case described in the first embodiment apart from a mode relating to operation control, and thus, a description relating to the whole of the head-mounted display device is omitted.

Figure 15:
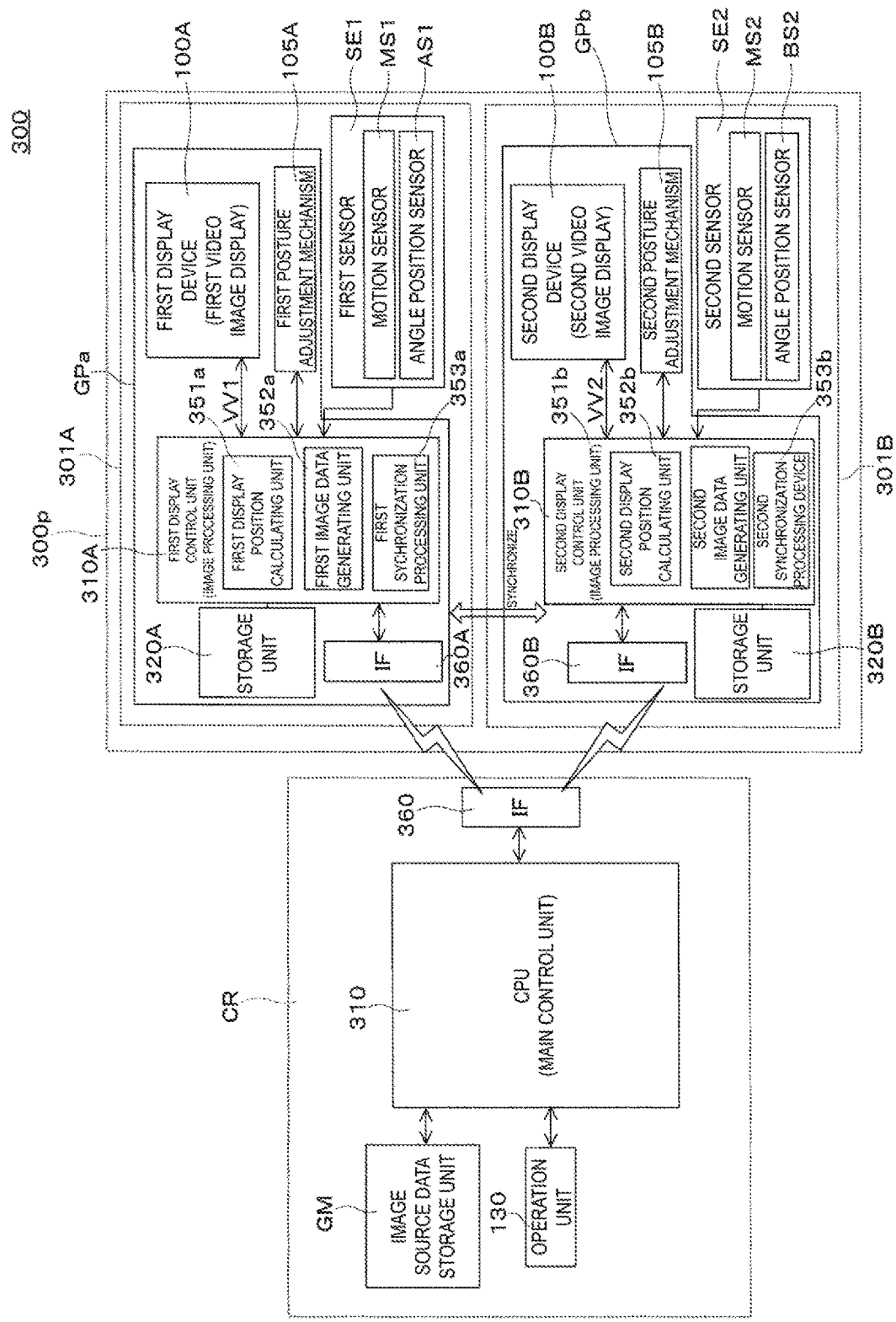
FIG. 15 is a block diagram for describing a control mechanism of the head-mounted display device according to a third embodiment.

FIG. 15 is a block diagram for describing a configuration example of a head-mounted display device 300 according to the third embodiment, and is a diagram corresponding to FIG. 2 and FIG. 14. For example, in the example illustrated in FIG. 14 of the second embodiment, the controller CR is connected to the first and second display optic systems 201A and 201B that configured the main body unit 200p by the two cables 240A and 240B. On the other hand, in both the first embodiment and the second embodiment, the control device CR is responsible for controlling the display content, that is, for various processes related to the image. In contrast to that, in the present embodiment, as illustrated in FIG. 15, a main body unit 300p, which is the mounting side, is divided into a first display optical system 301A and a second display optical system 301B, and the control of the display content is also performed in each of the display optical systems 301A and 301B. Note that in the example illustrated in FIG. 15, wireless communication (wireless communication) is used to exchange information between the control device CR and the first and second display optical systems 301A and 301B. However, similarly to the case illustrated in FIG. 14, a configuration via a cable is also possible.

A configuration of each component of the head-mounted display device 300 will be described below. First, in addition to an operation unit 130, the control device CR is provided with an image source data storage unit GM that stores source data (image content) of various images to be displayed, a CPU 310 that controls various operations, and a communication unit 360 that is an interface (IF) that communicates with the main body unit 300p, in place of the transmission units 191 and 192 illustrated in FIG. 2 and the like. Here, the CPU 310 generates image data to be provided as left and right images, on the basis of information stored in the image source data storage unit GM, and transmits the generated image data to each of the first and second display optical systems 301A and 301B that configure the main body 300p, via the communication unit 360. However, for example, the CPU 310 is not involved in a posture change of each of the display devices 100A and 100B, and does not specially perform the generation of the image data or processing of the image data corresponding to the display position change due to the posture change.

Next, of the main body 300p, the first display optical system 301A including the first display device 100A for the right eye is configured by the first image forming unit GPa and the first sensor SE1, similarly to the first display optical system 201A illustrated in FIG. 14. Of those, in addition to the first display device 100A and the first posture adjustment mechanism 105A, the first image forming unit GPa, in particular, is provided with a first display control unit 310A that controls the display content of the first image IM1, and a storage unit 320A. Further, in addition to the above, the first image forming unit GPa is provided with a communication unit 360A, which is an interface (IF) that communicates with the communication unit 360 of the control device CR in order to perform bi-directional communication with the control device CR, in place of the reception unit 193 illustrated in FIG. 2 and the like. In order to perform control of the display content, that is, to perform various processes relating to the images, the first display control unit 310A includes a first display position calculating unit 351a that calculates a display position of the first video image and a first image data generating unit 352a that generates image data to be output on the basis of the calculation result of the first display position calculating unit 351a. Furthermore, the first display control unit 310A is provided with a first synchronization processing unit 353a that performs synchronization processing on the basis of communication with the second display optical system 301B, via the communication unit 360A, in order to perform image formation aligned with the second display optical system 301B. Note that the storage unit 320A stores various information acquired in the first display control unit 310A. As a result of the first display control unit 310A having the above-described components, the function of the display control unit 150 in FIG. 2 in the first embodiment can be carried out in the first display optical system 301A including the first display device 100A for the right eye.

Similarly, the second display optical system 301B including the second display device 100B for the left eye is configured by the second image forming unit GPb and the second sensor SE2. Of those, in addition to the second display device 100B and the second posture adjustment mechanism 105B, the second image forming unit GPb is provided with a second display control unit 310B that controls the display content of the second image IM2, and a storage unit 320B. Further, a communication unit 360B is provided, which is an interface (IF) for performing communication via the communication unit 360 of the control device CR and the communication unit 360a of the first display optical system 301A. Furthermore, the second display control unit 310B includes a second display position calculating unit 351b, a second image data generating unit 352b, and a second synchronization processing unit 353b.

In other words, in the present embodiment, the display control unit of the head-mounted display device 300 is configured by the first display control unit 310A, the second display control unit 310B, and the first and second synchronization processing units 353a and 353b, which are display operation synchronizing units that synchronize the display operations of the first display control unit 310A and the second display control unit 310B. Specifically, these components work in conjunction with each other and the image information VV1 and VV2 are generated as video signals to be transmitted to the first and second display devices 100A and 100B.

As described above, in the head-mounted display apparatus 300 according to the present embodiment, mutually different display contents can be visually recognized as the first video image IM1 and the second video image IM2 in the first and second display devices 100A and 100B. The first and second posture adjustment mechanisms 105A and 105B, which are the posture adjustment mechanisms, allow the display positions of the first video image IM1 and the second video image IM2 to be changed. In addition, the display control unit configured by the first and second display control units 310A and 310B and the first and second synchronization processing units 353a and 353b controls the display content in accordance with the position change of at least one of the display positions of the first video image IM1 and the second video image IM2. Thus, for example, the optical performance and the miniaturization can be maintained while increasing a displayed information amount by separately displaying various information, in comparison to a case in which an image of a single size is visually recognized by both eyes, for example.

Fourth Embodiment

Below, an example of a head-mounted display device according to a fourth embodiment will be described with reference to FIG. 16.

The head-mounted display device according to the present embodiment is a modified example of the head-mounted display device exemplified in the first embodiment, and is similar to the case described in the first embodiment apart from differences in a configuration of a display device and a method of the posture adjustment, and thus, a description relating to the whole of the head-mounted display device is omitted.

Figure 16:
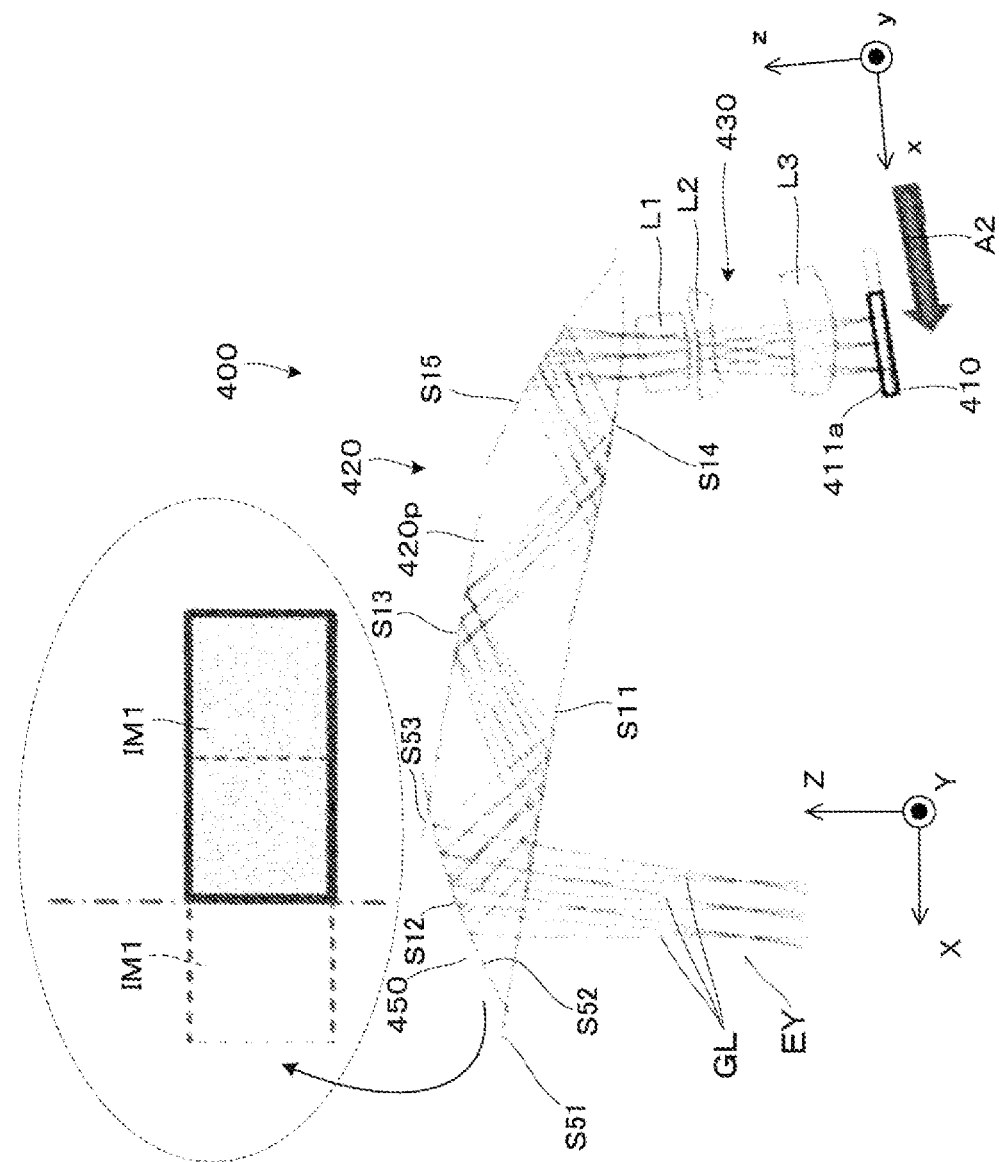
FIG. 16 is a schematic plan view illustrating a head-mounted display device according to a fourth embodiment.

FIG. 16 is a schematic plan view illustrating a configuration example of a head-mounted display device 400 according to the present embodiment. Note that in FIG. 16, only a first display device 400A for the right eye is illustrated. A second display device for the left eye is the same as the first display device 400A, and thus the illustration thereof is omitted.

As illustrated, as in the case of the first display device 100A according to the first embodiment illustrated in FIG. 13 and the like, in addition to an image display device 410, which is a display element that emits the image light GL from a light emitting surface 411a that is an image surface, the first display device 400A includes a projection lens 430 configured by the three lenses L1 to L3, and a light-guiding device 420.

Here, the light-guiding device 420 includes a light guiding member 420p for guiding light and for a see-through perspective, and a light transmitting member 450 for the see-through perspective.

The light guiding member 420p includes first to fifth sides S11 to S15 as side surfaces having an optical function. Of these surfaces, the first surface S11 and the fourth surface S14 are adjacent, and the third surface S13 and the fifth surface S15 are adjacent. Further, the second surface S12 is disposed between the first surface S11 and the third surface S13. A half mirror layer is attached to the surface of the second surface S12. The half mirror layer is a reflective film having light transmissivity, (a semi-transmissive reflective film) that is formed by depositing a metallic reflective film or a dielectric multilayer film, and is provided with appropriate reflectivity with respect to the image light. Specifically, the light guiding member 420p includes a transmissive reflective surface that covers the front of the eyes when worn by the observer.

The light transmitting member 450 is integrally fixed with the light guiding member 420p, thus configuring the single light-guiding device 420, and is a member (auxiliary optical block) that assists the see-through function of the light guiding member 420p. The light guiding member 450, which is a light transmitting portion, has a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of the first surface S11 of the light guiding member 420p, the second transmission surface S52 is a curved surface that is joined to and integrated with the second surface S12, and the third transmission surface S53 is on an extended surface of the third surface S13 of the light guiding member 420p. In other words, the first surface S11 and the first transmission surface S51 are adjacent to each other, and similarly, the third surface S13 and the third transmission surface S53 are adjacent to each other, and both are aligned to be flush with each other and form a smooth surface.

An outline explanation of the optical path of the image light GL will be given below with reference to FIG. 16. The light guiding member 420p causes the image light GL from the projection lens 430 to be incident, and guides the image light GL toward the eye of the observer, by reflecting the image light GL using the first to fifth surfaces S11 to S15 and the like. Specifically, the image light GL from the projection lens 430 is first incident on the fourth face S14 and reflected by the fifth face S15, is incident again from the inner side on the fourth surface S14 and is totally reflected, is incident on and totally reflected by the third surface S13, and is incident on and totally reflected by the first surface S11. The image light GL totally reflected by the first surface S11 is incident on the second surface S12, is partially reflected while partially passing through the half mirror layer provided on the second surface S12, and is once more incident on and passes through the first surface S11. The image light GL that has passed through the first surface S11 is incident, as a substantially parallel luminous flux, on the eye of the observer or an equivalent position. In other words, the observer observes the image formed by the image light GL as the virtual image.

Further, as described above, the light-guiding device 420 allows the observer to visually recognize the image light using the light guiding member 420p, and also, due to the light guiding member 420p and the light transmission member 450 operating in conjunction, causes the observer to observe the external world image having little distortion. At this time, since the third surface S13 and the first surface S11 are substantially parallel to each other (diopter is approximately 0), almost no aberration or the like occurs in the external world light. Further, similarly, the third transmission surface S53 and the first transmission surface S51 are planes that are substantially parallel to each other. Furthermore, since the third transmission surface S53 and the first surface S11 are planes that are substantially parallel to each other, almost no aberration or the like occurs. As described above, the observer observes the external world image that has no distortion through the light transmission member 450.

As described above, in the present embodiment, in the interior of the light guiding member 420p, the image light from the image display device 410 is guided by being reflected five times, from the first surface S11 to the fifth surface S15, including being totally reflected at least two times. As a result, both the display of the image light and the see-through perspective that causes the external world light to be visually recognized can be achieved, and aberration correction of the image light GL can be performed.

In the above-described configuration, in the present embodiment, as illustrated by the arrow A2, by having, as the posture adjustment mechanism, the mechanism (not illustrated) that causes the parallel translation of the image display device 410 in the x direction along the light emission surface 441a that is the image surface, the display position of the video image can be changed, as illustrated by a partially enlarged diagram. Note that various modes are possible for the mechanism that causes the parallel translation of the image display device 410, and it is conceivable to adopt a configuration in which the image display device 410 is moved manually or automatically by providing a sliding mechanism, for example.

Note that although an illustration and description thereof have been omitted, the second display device for the left eye and the like have a similar configuration. Specifically, in the case of the present embodiment, the posture adjustment can be performed independently for the left and the right in the left-right direction (the X direction).

Further, the direction in which the parallel translation of the image display device 410 is caused may be the parallel translation in the y direction so as to perform the posture adjustment in the up-down direction (the Y direction) independently for the left and the right.

Further, in the above description, the image display device 410 is subject to the parallel translation, but the same situation as described above may be created by preparing the image display device 410 having a large size in advance, for example, and changing an illumination range of the light emitting surface 411a.

As described above, in the head-mounted display apparatus 400 according to the present embodiment also, the mutually different display contents can be visually recognized in the first and second display devices as the first and second video images. Further, by causing the display positions of the first and second video images to be changeable by the first and second positional adjustment mechanisms, which are the positional adjustment mechanism, the optical performance and miniaturization can be maintained while increasing a displayed information amount by separately displaying various information, in comparison to a case in which an image of a single size is visually recognized by both eyes, for example. In particular, in the case of the present embodiment, the display modes of the first and second video images can be changed by the parallel translation of the image display device 410.

Further, it is also conceivable to provide a rotatable mechanism having the type of configuration exemplified in the first embodiment for the first and second display devices having the configuration including the light-guiding device configured by the light guiding member and the light transmitting member, as in the above-described mode. Furthermore, in the first and second display devices having a configuration in which the entire optical system exemplified in the first exemplary embodiment is rotatable, the image display device may further be subject to the parallel translation.

Furthermore, the mechanism causing the parallel translation of the image display device may be combined with the rotation mechanism of the main frame and the subframes. In this case, each of movable ranges can be adjusted.

Other

The present disclosure is not limited to the embodiments described above, and can be implemented in various aspects, insofar as the aspect does not depart from the spirit and the scope of the disclosure.

Figure 17:
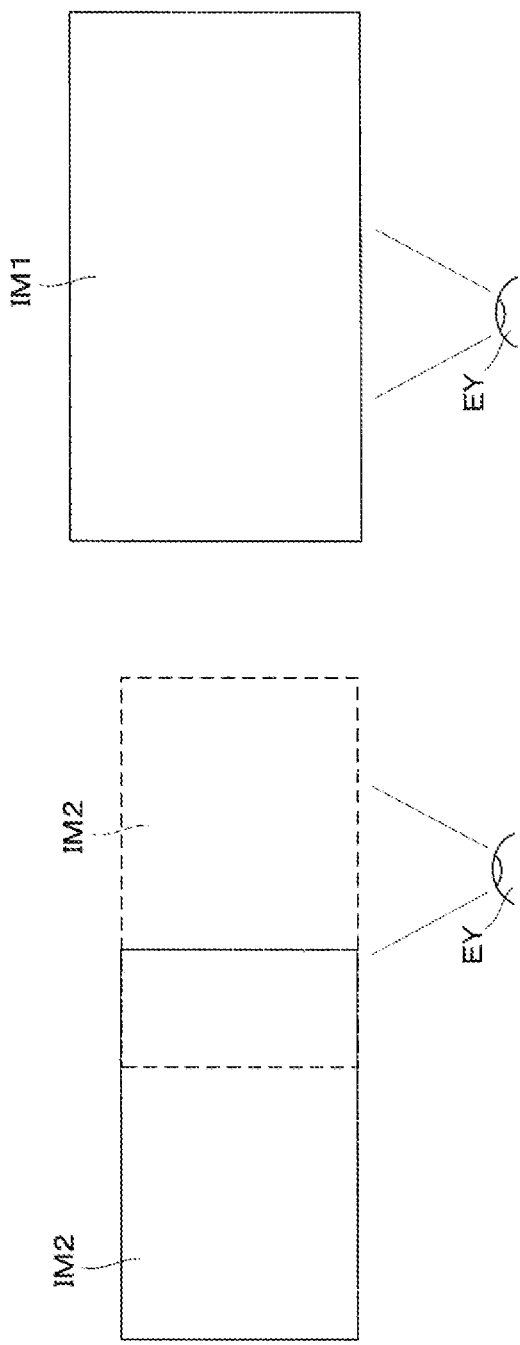
FIG. 17 is a conceptual diagram illustrating a video region recognized by stereoscopic vision in the head-mounted display device according to a modified example.

For example, in the above description, the first and second display devices are the same on both the left and right as a pair, but as illustrated in FIG. 17, for example, one of the video images may be larger than the other, or only one of the images may be configured to be repositionable. Furthermore, it is also conceivable that one of the display regions is horizontally long and the other is vertically long.

Furthermore, in the above description, a case is described in which the images for the left and the right are moved, in principle, along the direction in which the eyes are aligned side by side, but a configuration may be employed in which the images can be moved up and down, for example. Furthermore, for example, a configuration may be employed in which, for the left eye, the image can be moved in the horizontal direction in which the eyes are aligned side by side (the X direction), that is to the left and to the right, while, for the right eye, the image can be moved up and down. Furthermore, it is also conceivable for the image to be movable in the up, down, left and right directions, as if moving on a spherical surface with respect to the center of the pupil.

Figure 18:
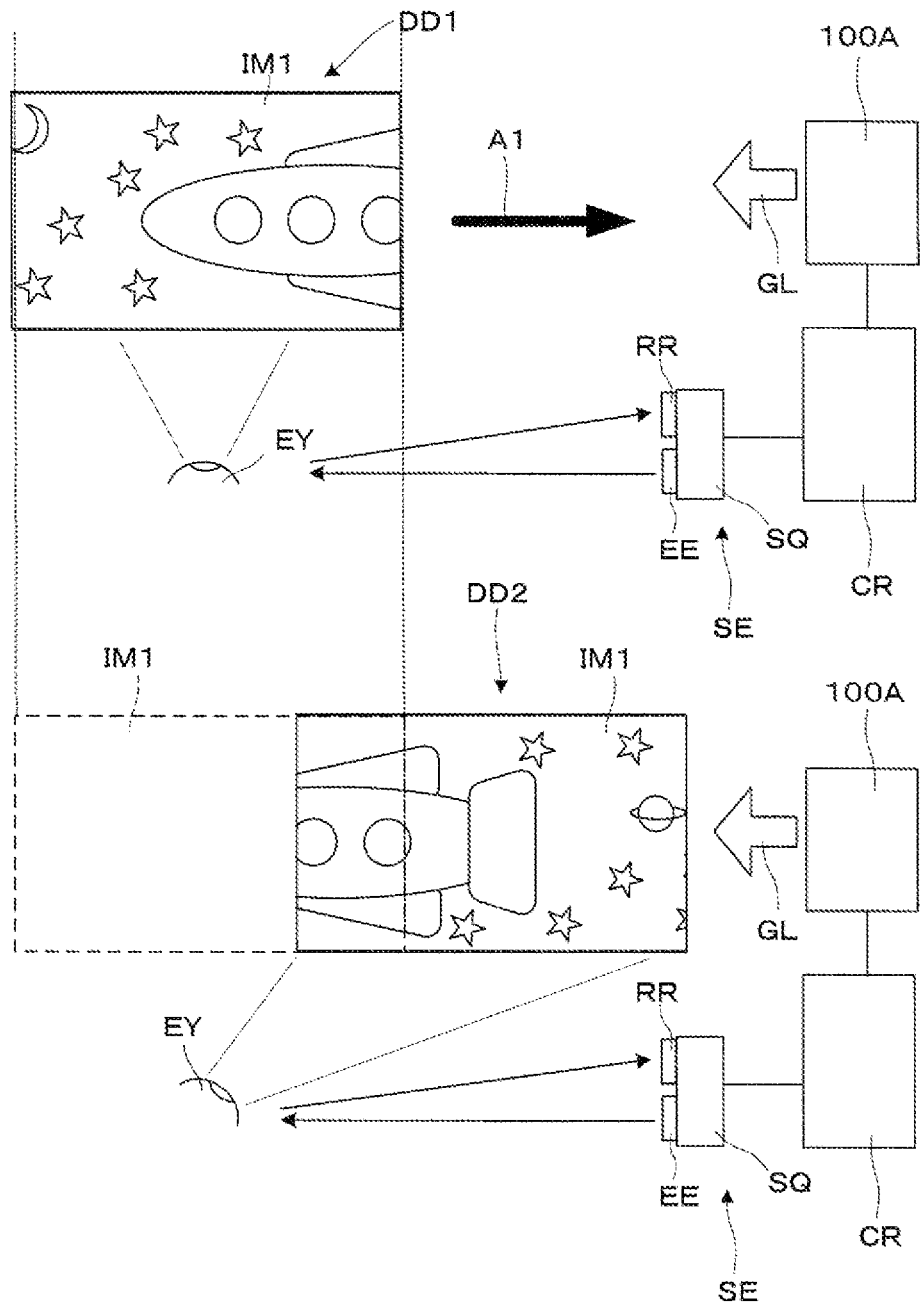
FIG. 18 is a conceptual diagram illustrating another example of operations performed in display position change.

Furthermore, as illustrated in FIG. 18, for example, line-of-sight detection may be performed, and the display position may be changed in accordance with the result of line-of-sight detection. Specifically, as illustrated, a line-of-sight sensor SQ, which is a line-of-sight detector, may be provided, for example, in the sensor SE, the movement of the eye EY of the observer may be captured by the line-of-sight sensor SQ, and the display control may be performed in accordance therewith. Note that in the illustrated example, a state is illustrated in which the position of the video image IM1 is moved in the direction of the arrow A1 in accordance with the movement of the eye EY. Further, in the illustration, for example, the line-of-sight sensor SQ includes a light emitting unit EE and a light receiving unit RR. The direction of the line-of-sight is detected by applying weak infrared light from the light emitting unit EE to the eye EY and capturing the reflected light of the retina and the cornea using the receiver RR. In this way, the line-of-sight sensor SQ functions as a line-of-sight detection unit. In this case, various pieces of information may be individually displayed in response to the movement of the pupil, allowing displayed information to be dynamically changed in response to the movement of the pupil. Thus, for example, the provision of dynamic information in response to movement can be ascertained. Further, in order to perform the same operations as described above, for example, a camera that captures the eye EY may be provided, and the display position for the left and right eyes EY may be estimated from the imaging results of the camera.

Additionally, various devices other than the devices described above can be used as the image display device 10, such as an HTPS as a transmissive liquid crystal display device. For example, a configuration using a reflective liquid crystal display device can also be employed, or a digital micro-mirror device and the like can also be used in place of the video display element formed by the liquid crystal display device and the like.

Further, in the above description, in the first embodiment, the control device CR is connected to the body 100p by the cable 40, and the control device CR and the body 100p are provided as separate bodies, but some or all of the control device CR may be integrated with the body 100p, for example. Alternatively, similar to the other embodiments, the control device CR and the main body unit 100p may exchange information via the wireless communication without passing through the cable 40.

In addition, the head-mounted display device having the configuration described above can be considered to configure a type of communication system, for example. That is, the above-described disclosure can be considered as a display control system of a head-mounted display device.

Additionally, the techniques of the present disclosure may be employed in a so-called closed-type (not see-through type) virtual image display device configured to make only image light visually recognized. In addition, the techniques of the present disclosure may also be employed in a device enabling an observer to visually recognize or observe an external world image in a see-through manner, and may be applied to a so-called video see-through product including a display device and an image device.

Additionally, the techniques of the present disclosure are applicable to a binocular type hand held display or the like.

In addition, in the case of the above-described modes, in the generation of the image information VV1 and VV2 as image signals by the display control unit 150 or the like, it is conceivable to include various types of information such as information relating to the resolution of the image.

Additionally, in the above description, in the fourth embodiment, with respect to the location at which the semi-transmissive reflective film, which transmits a part of the image light and reflects another part of the image light, is provided, it is conceivable that a similar role is achieved by providing, for example, an optical function surface formed by a diffraction element such as a volume hologram or the like, in place of the semi-transmissive reflective film.

Note that, for the sensor SE also, various methods of use are conceivable, and for example, a posture relationship between the first display device and the second display device and the main frame 102 may be estimated from a gyroscopic sensor configuring the sensor SE, an angle sensor, or the like.

As described above, a head-mounted display device according to an aspect of the present disclosure includes a left and right pair of a first display device and a second display device configured to repositionably display a first video image and a second video having mutually different display contents, and a display control unit configured to control the display content in accordance with at least one of a display position change of the first video image in the first display device and a display position change of the second video image in the second display device.

In the above-described head-mounted display device, in the left and right pair of the first display device and the second display device that perform the repositionable display, the mutually different display contents can be visually recognized as the first video image and the second video image. Further, by the display control device controlling the display content in accordance with the position change of at least one of the display position change of the first video image and the display position change of the second video image, an optical performance and miniaturization can be maintained while increasing a displayed information amount by separately displaying various information, in comparison to a case in which an image of a single size is visually recognized by both eyes, for example.

In a specific aspect of the present disclosure, the first display device and the second display device change the display in a range over which the display position of the first video image and the display position of the second video image are separated from each other. In this case, superimposition of the display position of the first video image and the display position of the second video image can be avoided.

In another aspect of the present disclosure, the first display device and the second display device display the first video image and the second video image in a display position outside of a front-facing position. In this case, for example, a front external world view can be secured.

In another aspect of the present disclosure, in a superimposed range of the display position of the first video image and the display position of the second video image, the display control unit blocks a video image section of one of the first video image and the second video image. In this case, the superimposition of the display position of the first video image and the display position of the second video image can be avoided by blocking the video image section.

In yet another aspect of the present disclosure, the first display device and the second display device use an organic EL as a light source of the first video image and the second video image. In this case, image formation that suppresses black floating is possible.

In yet another aspect of the present disclosure, the display control unit changes a control mode depending on a display content change mode that changes the display content in accordance with a display position change of a video image, and a display content maintaining mode that maintains the display content regardless of the display position change. In this case, there may be variations in the method of display, and a mode may be employed in accordance with an application of the video display.

In yet another aspect of the present disclosure, the display control unit changes the display content to maintain a positional relationship of the display content in a virtual video image display space in the display content change mode. In this case, it is possible to employ a method of display in which the image content is changed so that a section that can be viewed seems to change along with the movement of the display position.

Yet another aspect of the present disclosure further includes a posture detecting unit configured to detect a posture of the first display device and the second display device and to output a detection result to the display control unit. In this case, appropriate display control can be performed on the basis of information from the posture detecting unit.

In yet another aspect of the present disclosure, the display control unit includes a first display control unit configured to control the display content for the first video image, a second display control unit configured to control the display content for the second video image, and a display operation synchronizing unit configured to synchronize display operations between the first display control unit and the second display control unit. In this case, the control of the first video image by the first display control unit and the control of the second video image by the second display control unit can be performed accurately while synchronizing the display operations using the operation synchronizing unit.

Yet another aspect of the present disclosure further includes a posture adjustment mechanism configured to change a display position of a video image corresponding to one of the first video image and the second video image, by adjusting a posture of at least one of the first display device and the second display device. In this case, the display positions of the first video image and the second video image can be changed by the posture adjustment mechanism.

A display control method for a head-mounted display device according to an aspect of the present disclosure is a display control method for a head-mounted display device that includes a left and right pair of a first display device and a second display device that repositionably display a first video image and a second video having mutually different display contents. The display control method controls the display content in accordance with at least one of a display position change of the first video image in the first display device and a display position change of the second video image in the second display device.

In the display control method for the head-mounted display device, in the left and right pair of the first display device and the second display device that perform the repositionable display, the mutually different display contents can be visually recognized as the first video image and the second video image. Further, by controlling the display content in accordance with the position change of at least one of the display position change of the first video image and the display position change of the second video image, the optical performance and miniaturization of the head-mounted display device can be maintained while increasing the displayed information amount by separately displaying various information, in comparison to the case in which the image of the single size is visually recognized by both eyes, for example.

A display control system for a head-mounted display device according to an aspect of the present disclosure includes a left and right pair of a first display device and a second display device that repositionably display a first video image and a second video having mutually different display contents, and a display control unit configured to control the display content in accordance with at least one of a display position change of the first video image in the first display device and a display position change of the second video image in the second display device.

In the display control system of the head-mounted display device, in the left and right pair of the first display device and the second display device that perform the repositionable display, the mutually different display contents can be visually recognized as the first video image and the second video image. Further, by the display control unit controlling the display content in accordance with the position change of at least one of the display position change of the first video image and the display position change of the second video image, the optical performance and miniaturization can be maintained while increasing the displayed information amount by separately displaying various information, in comparison to the case in which the image of the single size is visually recognized by both eyes, for example.

A display optical system for a head-mounted display device according to an aspect of the present disclosure includes a left and right pair of a first display device and a second display device that repositionably display a first video image and a second video image having mutually different display contents. The display optical system outputs, to a display control device that controls the display content, information relating to a display position change in the first display device and the second display device.

In the display optical system for the head-mounted display device, in the left and right pair of the first display device and the second display device that perform the repositionable display, the mutually different display contents can be visually recognized as the first video image and the second video image. Further, by outputting, to the display control unit, the information relating to the display position change in the first display device and the second display device, it is possible to control the display content in accordance with the position change of the display position changes of the first video image and the second video image, and the optical performance and miniaturization can be maintained while increasing the displayed information amount by separately displaying various information, in comparison to the case in which the image of the single size is visually recognized by both eyes, for example.

A display control device for a head-mounted display device according to an aspect of the present disclosure is a display control device configured to generate and output a display content, based on information relating to a display position change from a first display device and a second display device, to the left and right pair of the first display device and the second display device that repositionably display a first video image and a second video image having mutually different display contents.

In the display control device for the head-mounted display device, on the basis of the information relating to the display position change from the first display device and the second display device, the display content is generated and output to the left and right pair of the first display device and the second display device that perform the repositionable display, with respect to the first video image and the second video image in the first display device and the second display device, the optical performance and miniaturization of the first display device and the second display device can be maintained while increasing the displayed information amount by separately displaying various information, in comparison to the case in which the image of the single size is visually recognized by both eyes, for example.

A display control program for a head-mounted display device according to an aspect of the present disclosure is a display control program for a head-mounted display device that includes a left and right pair of a first display device and a second display device that repositionably display a first video image and a second video image having mutually different display contents. The display control program controls the display content in accordance with at least one of a display position change of the first video image in the first display device and a display position change of the second video image in the second display device.

In the display control program for the head-mounted display device, in the left and right pair of the first display device and the second display device that perform the repositionable display, the mutually different display contents can be visually recognized as the first video image and the second video image. Further, by controlling the display content in accordance with the position change of at least one of the display position change of the first video image and the display position change of the second video image, the optical performance and the miniaturization of the head-mounted display device can be maintained while increasing the displayed information amount by separately displaying various information, in comparison to the case in which the image of the single size is visually recognized by both eyes, for example.

What is claimed is:

1. A head-mounted display device comprising:
   a left and right pair of a first display device and a second display device configured to repositionably display a first video image and a second video image having mutually different display contents; and
   a display control unit configured to control the display content in accordance with at least one of a display position change of the first video image in the first display device and a display position change of the second video image in the second display device, wherein
   in a superimposed range of the display position of the first video image and the display position of the second video image, the display control unit blocks a video image section of one of the first video image and the second video image,
   the blocked portion of the video image section is in the superimposed range, and
   the display control unit only blocks the first display image.

2. The head-mounted display device according to claim 1, wherein the first display device and the second display device change the display in a range over which the display position of the first video image and the display position of the second video image are separated from each other.

3. The head-mounted display device according to claim 2, wherein the first display device and the second display device display the first video image and the second video image in a display position outside of a front-facing position.

4. The head-mounted display device according to claim 1, wherein the first display device and the second display device use an organic EL as a light source of the first video image and the second video image.

5. The head-mounted display device according to claim 1, wherein the display control unit changes a control mode depending on a display content change mode that changes the display content in conjunction with a display position change of a video image, and a display content maintaining mode that maintains the display content regardless of the display position change.

6. The head-mounted display device according to claim 5, wherein the display control unit changes the display content to maintain a positional relationship of the display content in a virtual video image display space in the display content change mode.

7. The head mounted type display device according to claim 1, comprising:
   a posture adjustment mechanism configured to change, by adjusting a posture of at least one of the first display device and the second display device, a display position of a corresponding one of the first video image and the second video image.

8. The head-mounted display device according to claim 1, comprising:
   a posture detecting unit configured to detect a posture of the first display device and the second display device and to output a detection result to the display control unit.

9. The head-mounted display device according to claim 1, wherein the display control unit includes:
   a first display control unit configured to control the display content for the first video image;
   a second display control unit configured to control the display content for the second video image; and
   a display operation synchronizing unit configured to synchronize display operations between the first display control unit and the second display control unit.

10. A display control method for a head-mounted display device that includes a left and right pair of a first display device and a second display device that repositionably display a first video image and a second video having mutually different display contents, the method comprising:
- controlling the display content in accordance with at least one of a display position change of the first video image in the first display device and a display position change of the second video image in the second display device, and
- blocking a video image section of one of the first video image and the second video image in a superimposed range of the display position of the first video image and the display position of the second video image,
- wherein the blocked portion of the video image section is in the superimposed range and
- the blocking is performed on only the first display image.

11. A non-transitory computer-readable storage medium, comprising a display control program for a head-mounted display device that includes a left and right pair of a first display device and a second display device that repositionably display a first video image and a second video image having mutually different display contents, the display control program comprising:
- controlling the display content in accordance with at least one of a display position change of the first video image in the first display device and a display position change of the second video image in the second display device; and
- blocking a video image section of one of the first video image and the second video image in a superimposed range of the display position of the first video image and the display position of the second video image,
- wherein the blocked portion of the video image section is in the superimposed range, and
- the blocking is performed on only the first display image.

* * * * *